US008018871B2

(12) United States Patent
Hatano

(10) Patent No.: US 8,018,871 B2
(45) Date of Patent: Sep. 13, 2011

(54) NETWORK MANAGEMENT SYSTEM, NETWORK MANAGEMENT METHOD, INFORMATION PROCESSING APPARATUS, DEVICE, AND STORAGE MEDIUM

(75) Inventor: Manami Hatano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 992 days.

(21) Appl. No.: 11/677,162

(22) Filed: Feb. 21, 2007

(65) Prior Publication Data

US 2007/0195782 A1 Aug. 23, 2007

(30) Foreign Application Priority Data

Feb. 22, 2006 (JP) ................................. 2006-045503

(51) Int. Cl.
*H04L 12/28* (2006.01)
*G06F 15/177* (2006.01)
*G06F 15/173* (2006.01)

(52) U.S. Cl. ........................................ 370/254; 709/220
(58) Field of Classification Search .................. None
See application file for complete search history.

(56) References Cited

U.S. PATENT DOCUMENTS

| 5,835,720 A * | 11/1998 | Nelson et al. ................. 709/224 |
| 6,981,036 B1 | 12/2005 | Hamada |

FOREIGN PATENT DOCUMENTS

| JP | 2000-285058 A | 10/2000 |
| JP | 2000-353141 A | 12/2000 |
| JP | 2003-108451 A | 4/2003 |
| JP | 2003-216572 | 7/2003 |
| JP | 2004-030245 A | 1/2004 |
| JP | 2004-086729 A | 3/2004 |
| JP | 2004-192585 A | 7/2004 |

OTHER PUBLICATIONS

D. Plummer, An Ethernet Address Resolution Protocol, RFC 826, Network Working Group, Nov. 1982, pp. 1-11.*
The above reference was cited in a May 26, 2009 Japanese Office Action that issued in Japanese Patent Application No. 2006-045503, a which is not enclosed.
The above references were cited in a Jun. 10, 2008 Japanese Office Action issued in the counterpart Japanese Patent Application 2006-045503.

* cited by examiner

*Primary Examiner* — Daniel J Ryman
*Assistant Examiner* — Christopher Crutchfield
(74) *Attorney, Agent, or Firm* — Cowan, Liebowitz & Latman, P.C.

(57) ABSTRACT

A network management system that is capable of managing each device in an information processing device efficiently even though on a network there are a plurality of the information processing apparatuses which search for devices to manage. A network management system comprises a multi-function printer (MFP) connected to a network, and a network management station that searches and manages the MFP. The MFP comprises a search source information recording unit that records information related to the network management station, which is a transmitter of a search packet, as search source information in response to receipt of the search packet, and a search source information transmitting unit that transmits the search source information to the network management station in response to request from the network management station. The network management station comprises a search source information acquisition requesting unit that requests acquisition of the search source information to the device, and a search source information obtaining unit that obtains the search source information transmitted from the MFP.

9 Claims, 24 Drawing Sheets

FIG. 10

MANAGED OBJECT NODE LIST (420)

| HARDWARE ID | NETWORK ADDRESS | TYPE | |
|---|---|---|---|
| 0XXXE03CD0751 | 172. xx. 56. yy | ZA-X3000 | ... |
| 0XYY0CD36094A | 172. xx. 56. zz | ZA-X2950 | ... |
| 0ZXY0B90F2CD8 | 172. xx. 56. yz | ZA-X2950ER | ... |
| ⋮ | ⋮ | ⋮ | |

FIG. 11

NETWORK MANAGEMENT STATION LIST (430)

| NETWORK ADDRESS | REVISION NUMBER |
|---|---|
| 172. AA. BB. CC | 1. 00. 03 |
| 172. EE. FF. GG | 1. 00. 05 |
| 172. XX. YY. ZZ | 1. 00. 05 |
| ⋮ | ⋮ |

FIG. 19

| SEARCH SOURCE LIST | 510 |
|---|---|
| HARDWARE ID | NETWORK ADDRESS |
| 0XXX0DF080B73 | 172. xx. yy. zz |
| 0YXY390CF0991 | 172. aa. bb. cc |
| 0ZYX6FA10BB96 | 172. rr. ss. tt |
| ⋮ | ⋮ |

FIG. 22

| SEARCH SOURCE LIST | | 550 |
|---|---|---|
| HARDWARE ID | NETWORK ADDRESS | SEARCH MANNER |
| 0XXX0D F 080B73 | 172. xx. yy. zz | BROADCAST |
| 0YXY390CF0991 | 172. aa. bb. cc | UNICAST |
| 0ZXY6FA10BB96 | 172. rr. ss. tt | MULTICAST |
| 0XXY90A320122 | 172. lll. mm. nn | UNICAST |
| 0YXY390CF0991 | 172. aa. bb. cc | BROADCAST |
| ⋮ | ⋮ | ⋮ |

NETWORK MANAGEMENT SYSTEM, NETWORK MANAGEMENT METHOD, INFORMATION PROCESSING APPARATUS, DEVICE, AND STORAGE MEDIUM

BACKGROUND OF THE INVENTION

1. Field of the Invention

The present invention relates to a network management system that manages devices connected to a network, a network management method, an information processing apparatus, a device, and a storage medium.

2. Description of the Related Art

Conventionally, a network management station, namely an information processing apparatus such as a personal computer manages a state of various devices (managed object nodes) connected to a network. In most cases, the network management station manages the whole network independently. In recent years, a demand for equipping and managing a plurality of network management stations has been increasing. However, a conventional operation of a plurality of the network management stations causes problems that a plurality of the network management stations perform settings contradictory each other to one of the devices (managed object node), which leads to incorrect settings as a result.

To this end, reduction in network load and unified management have been wanted to be realized by separating the search range among a plurality of the set network management stations and sharing the collected information one another. A system in which a plurality of the network management stations search for mutual existence and work together has been needed in order to fulfill the above demand.

Conventionally, each of the network management stations has searched for another of the network management stations by means of broadcast in order to search for the mutual existence (see e.g. Japanese Laid-Open Patent Publication (Kokai) No. 2003-216572), or the direct communication protocol has searched for another of the network management stations.

On the other hand, the network management station has needed to search for devices connected to the network managed by itself in order to realize its original purpose.

However, as in the above-mentioned prior art example, there has been a problem mentioned-below when each of the network management stations searches for another of the network management station by means of the broadcast or the direct communication protocol. Namely, this kind of search has caused very low efficiency in use of the network. Especially, it has increased traffic on the network to search frequently for nodes (devices), whose addresses on the network are not known preliminarily, by means of the broadcast or the direct communication protocol.

SUMMARY OF THE INVENTION

It is, therefore, an object of the present invention to provide a network management system that is capable of managing each device in an information processing device efficiently even though on a network there are a plurality of the information processing apparatuses which search for devices to manage, and a network management method therefor an information processing apparatus, a device and a storage medium.

To attain the above-mentioned object, according to a first aspect of the present invention, there is provided a network management system comprising a device connected to a network, and an information processing apparatus that searches and manages the device, wherein the device comprises: a search source information recording unit that records information related to the information processing apparatus, which is a transmitter of a search packet, as search source information in response to receipt of the search packet; and a search source information transmitting unit that transmits the search source information to the information processing apparatus in response to request from the information processing apparatus, and the information processing apparatus comprises: a search source information acquisition requesting unit that requests acquisition of the search source information to the device; and a search source information obtaining unit that obtains the search source information transmitted from the device.

The search source information preferably includes a network address.

The search source information further preferably includes hardware identification information, the device preferably comprises a hardware identification information determining unit that determines whether or not the hardware identification information of the search source is recorded in the search source information when the device itself is searched by the information processing apparatus, and the search source information recording unit, when the hardware identification information of the search source is determined to be already recorded, preferably, records the network address used in the search in the search source information, deletes the recorded information of the previous search by the same hardware identification information from the search source information, and holds the recorded information related to the information processing apparatuses that are identical in a network address with each other and different in hardware identification information from each other, without deleting the recorded information from the search source information.

The search source information preferably further includes the type of the search manner, the device preferably comprises a search manner determining unit that determines whether or not the type of the search manner included in the recorded information is the same as the type of the search manner in the present search when the hardware identification of the search source is already recorded in the search source information, wherein the recorded information is deleted from the search source information when the type of the search method is the same, and the recorded information is not deleted from the search source information when the type of the search method is different.

The information processing apparatus preferably comprises a confirmation request transmitting unit that transmits to one of the information processing apparatuses a request to confirm whether or not it is the same type of the information processing apparatus as its own, a network address recording unit that records a network address of the one of the information processing apparatuses which is confirmed to be the same type of the information processing apparatus as its own, a determination unit that determines whether or not a transmitter of the request is the same type of the information processing apparatus as its own when the request is received from another of the information-processing apparatuses, and a determination result transmitting unit that transmits a result of the determination to the another of the information processing apparatuses.

To attain the above-mentioned object, according to a second aspect of the present invention, there is provided a network management method in a network management system comprising a device connected to a network, and an information processing apparatus that searches and manages the device, wherein the device records information related to the information-processing apparatus, which is a transmitter of a search packet, as search source information in response to receipt of the search packet; and transmits the search source information to the information processing apparatus in response to request from the information-processing apparatus, and the information-processing apparatus requests acquisition of the search source information to the device; and obtains the search source information transmitted from the device.

To attain the above-mentioned object, according to a third aspect of the present invention, there is provided an information processing apparatus that searches and manages a device connected to a network, comprising: a search source information acquisition requesting unit that requests acquisition of the search source information to the device; and a search source information obtaining unit that obtains the search source information transmitted from the device.

To attain the above-mentioned object, according to a fourth aspect of the present invention, there is provided a device that is connected to a network and searched by an information processing apparatus, comprising: a search source information recording unit that records information related to the information processing apparatus, which is a transmitter of a search packet, as search source information in response to receipt of the search packet; and a search source information transmitting unit that transmits the search source information to the information processing apparatus in response to request from the information processing apparatus, According to a fifth aspect of the present invention, there is provided a program for causing a computer to execute the above-mentioned network management method.

According to a sixth aspect of the present invention, there is provided a computer-readable storage medium storing the above-mentioned program.

According to the present invention, it is possible to manage each device in an information processing apparatus efficiently even though on a network there are a plurality of the information processing apparatuses which search for devices to manage.

The above and other objects, features, and advantages of the invention will become more apparent from the following detailed description taken in conjunction with the accompanying drawings.

BRIEF DESCRIPTION OF THE DRAWINGS

FIG. 10 is a view showing an example of a managed object node list;

FIG. 11 is a view showing a network management station list;

FIG. 19 is a table showing an example of the search source list held by the managed object node;

FIG. 22 a table showing an example of the search source list held by the managed object node;

DETAILED DESCRIPTION OF THE PREFERRED EMBODIMENTS

Preferred embodiments of the present invention will be described in detail below with reference to the drawings.

A network management system according to a first embodiment of the present invention will be now described below.

Figure 1:
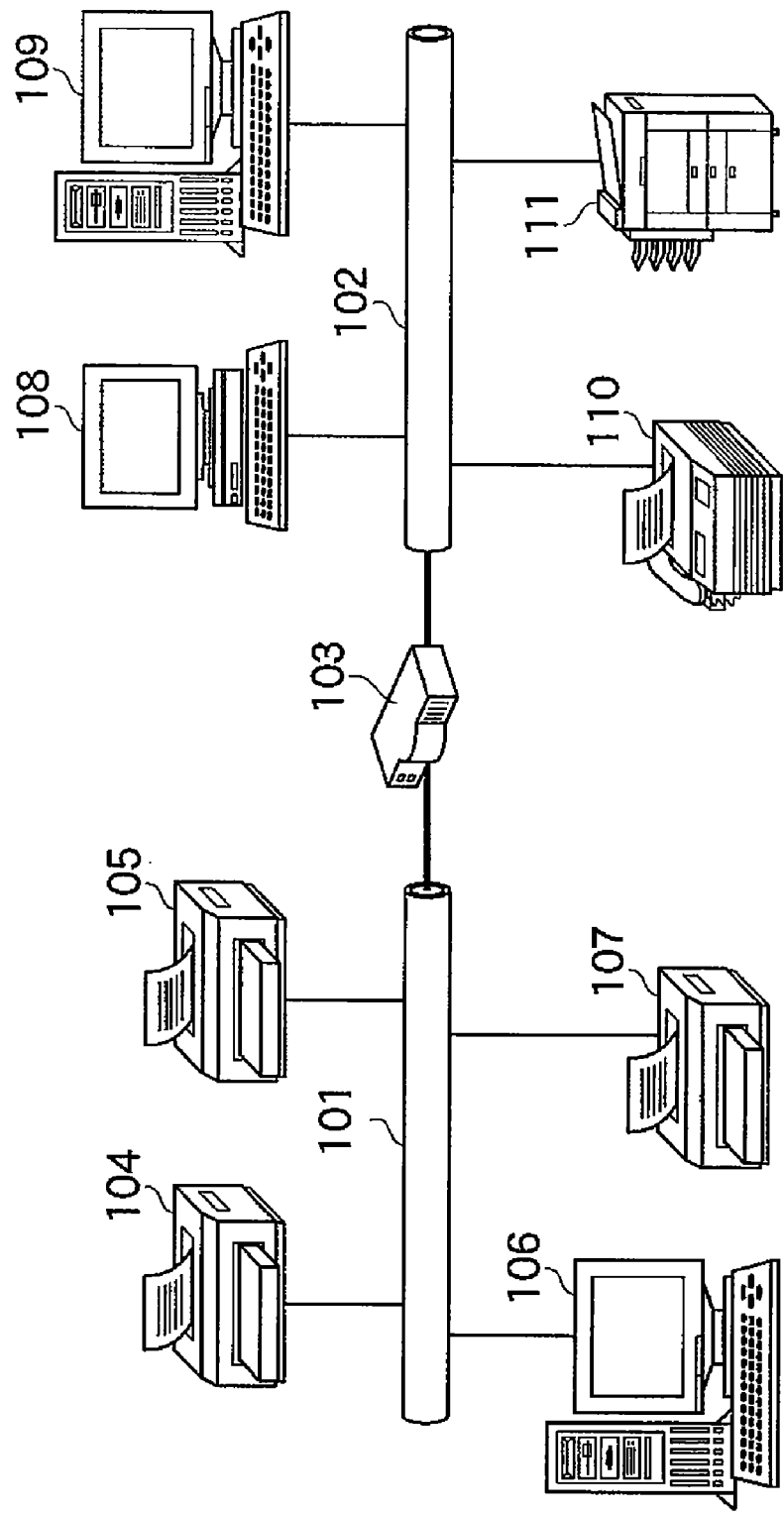
FIG. 1 is a view schematically showing the construction of a network management system according to a first embodiment of the present invention.

FIG. 1 is a diagram schematically showing the configuration of a network management system according to a first embodiment of the present invention. The network management system is provided with a first network 101, a second network 102, and a router 103 connecting the first network and the second network to each other. To the first network 101 is connected a network management station 106, and multifunction printers (MFPs) 104, 105 and 107, namely devices as managed objects of the network management station 106, whereas to the second network 102 is connected a work station computer 108, and a network management station 109, MFPs 110 and 111, namely devices as managed objects of the network management station 109.

Figure 2:
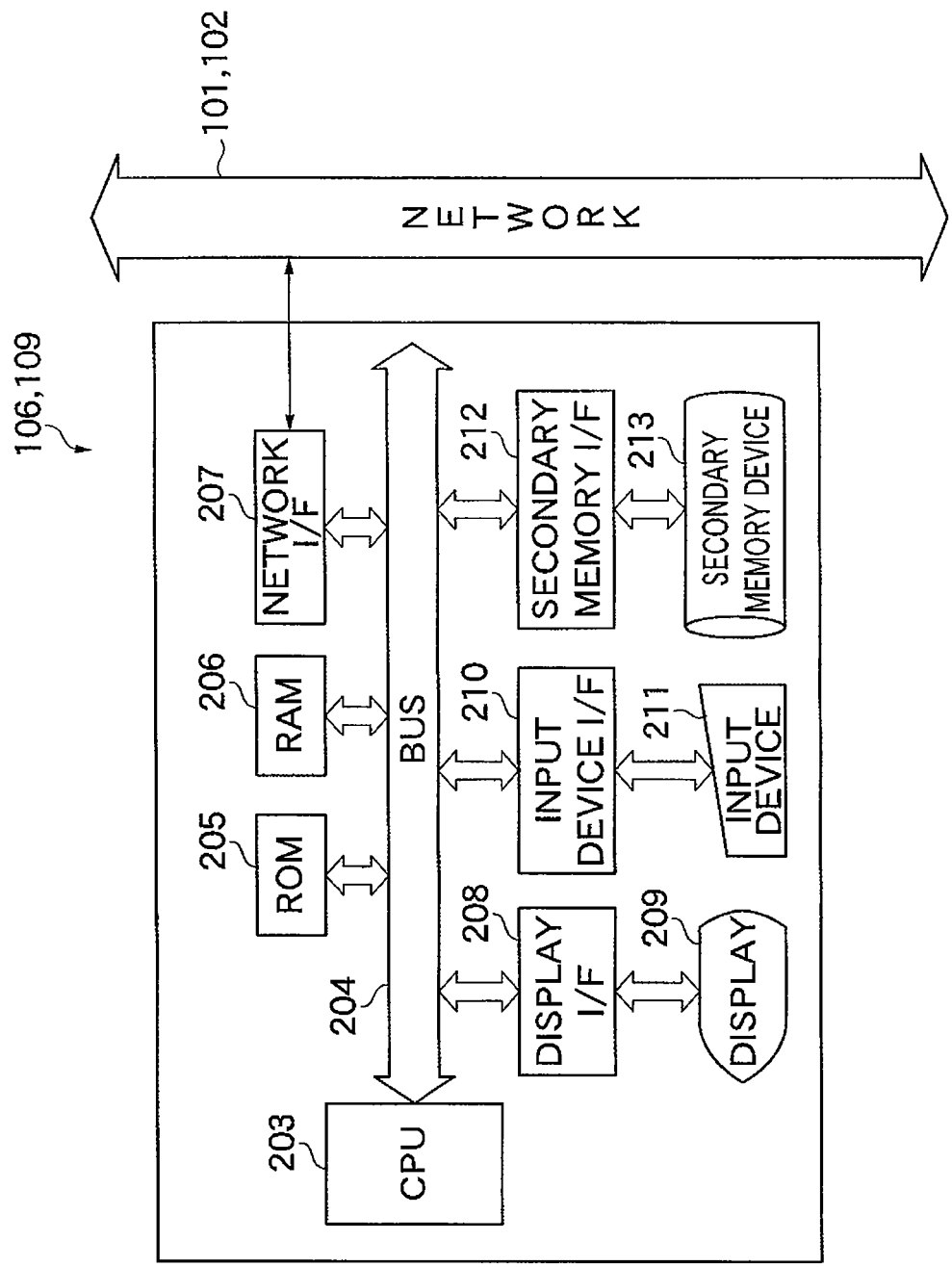
FIG. 2 is a block diagram of the construction of a network management station.

FIG. 2 is a block diagram of the configuration of the network management station 106 or 109. The network management station 106 or 109 is comprised of an information-processing apparatus such as a personal computer. In the network management station 106 or 109, a CPU 203, a ROM 205, a RAM 206, and a network I/F 207 that are well-known are connected with one another via a bus 204. Further, A display I/F 208, an input device I/F 210, and a secondary memory I/F 212 are connected to the bus 204.

The network I/F 207 connects the bus 204 and the network 101 (102) to each other. The display I/F 208 connects a display 209 connected thereto and the bus 204.

The input device I/F 210 connects an input device 211 connected thereto and the bus 204, and the secondary memory I/F 212 connects a secondary memory device 213 connected thereto and the bus 204.

Figure 3:
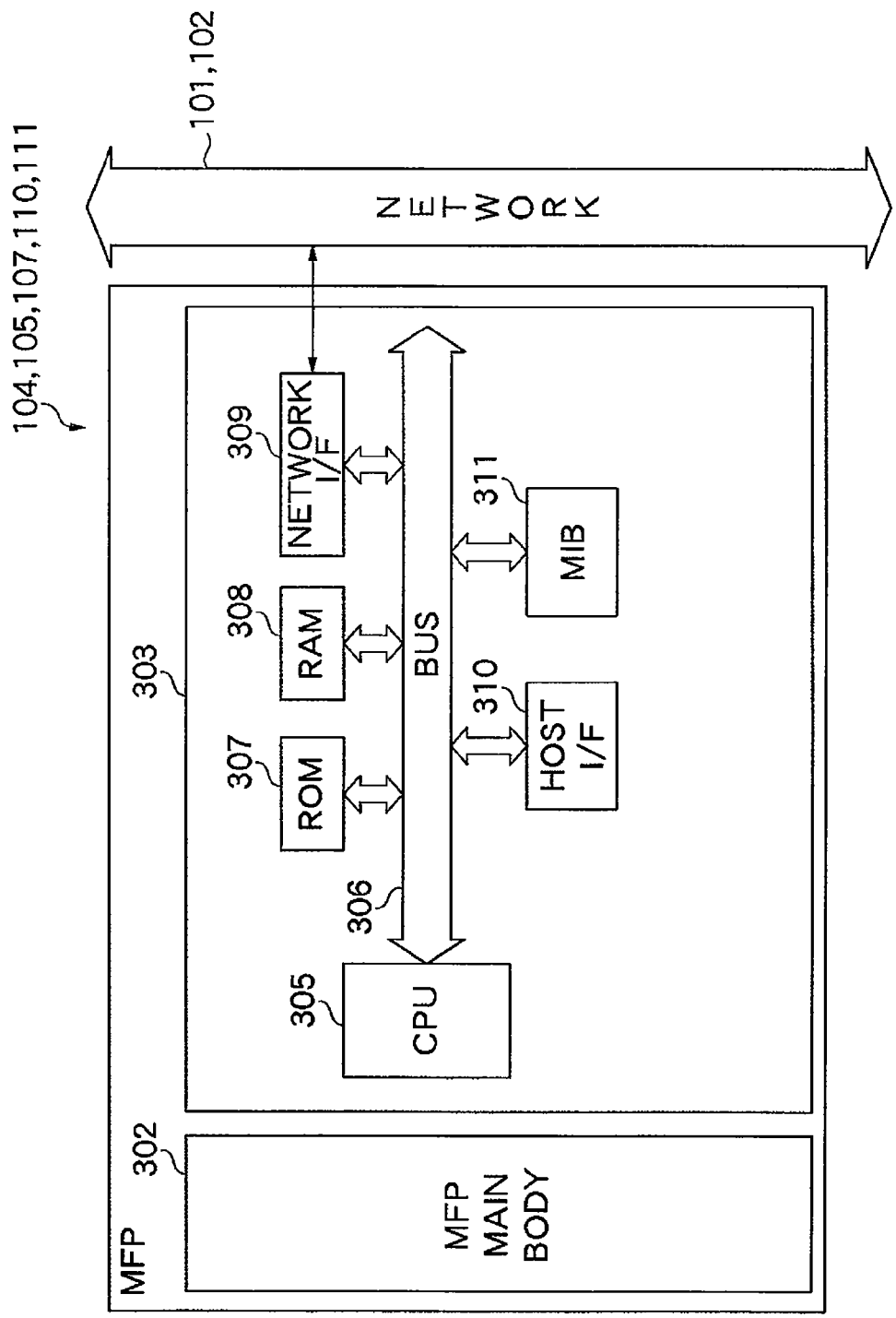
FIG. 3 is a block diagram of the hardware construction of management object nodes, namely MFPs.

FIG. 3 is a block diagram showing the hardware construction of the MFP 104, 105, 107, 110, or 111, as a managed object node. The MFP has an MFP main body 302 having functions of print, copy, and facsimile, and a network controller 303 that connects the MFP main body to a network 101 (102).

The network controller 303 is provided with a CPU 305, a ROM 307, a RAM 308, and a network I/F 309 that are connected with one another via a bus 306. To the bus 306 is connected a host I/F 310 that connects the MFP main body 302 to the bus 306, and a management information base (MIB) 311 that stores information for network management.

Figure 4:
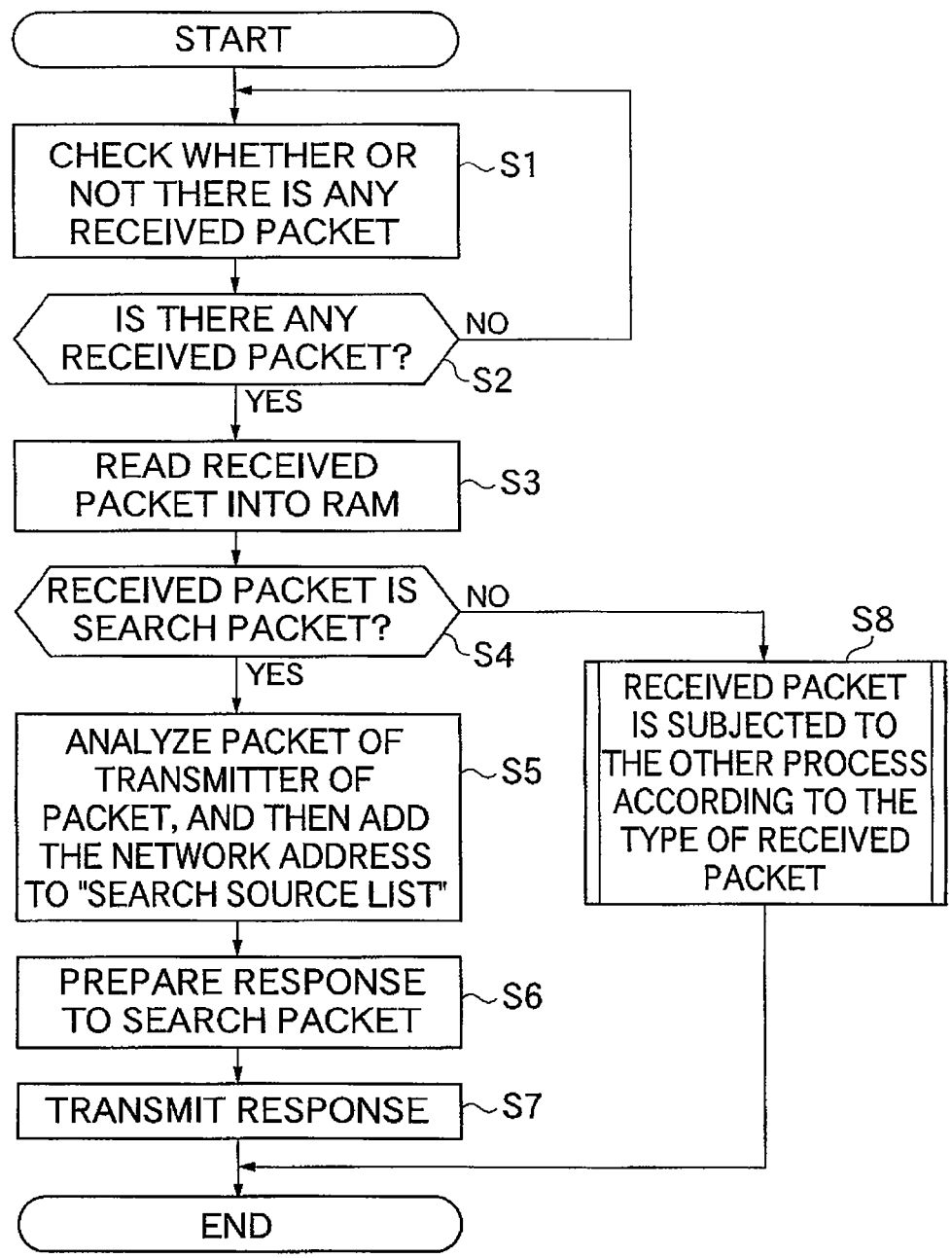
FIG. 4 is a flowchart showing the procedures for carrying out a process of receiving a search packet in a network controller in the MFP.

Operation of the network management system that has the above-mentioned configuration will be shown below. FIG. 4 is a flowchart showing the procedures for carrying out a process of receiving a search packet in the network controller 303 in the MFP. The program for the process is stored in the ROM 307 in the network controller 303, and executed by the CPU 305.

In this context, the search packet is designed for a packet in which the network management stations 106 or 109 checking whether there are any network nodes as managed objects on the network 101 or 102. In this embodiment, for example, the search packet includes a GET packet in which a command according to SNMP (Simple Network Management Protocol) to get a particular object ID is broadcasted, or unicasted. Otherwise, the search packet may be a pattern of a network packet used for search as a rule on the system. In this case, the network management stations 106 and 109, and the MFP 104, 105, 107, 110 and 111 as the managed object nodes are supposed to know such a pattern in advance.

In FIG. 4, first of all, it is checked whether there is any received packet or not (step S1). It is determined whether there is any received packet or not (step S2). When there is no received packet, the process returns to the step S1. On the other hand, when there is a received packet, the received packet is read into the RAM 308 (step S3).

Then, it is determined whether the received packet is a search packet or not (step S4). When the received packet is not a search packet, the received packet is subjected to the other process according to the type of the received packet (step S8), followed by terminating the process.

On the other hand, when the received packet is a search packet, the packet stored in the RAM 308 is analyzed, and a network address of the transmitter of the packet is obtained, and then added to a "search source list" allocated to the RAM 308 (step S5). Then, a response to the search packet is prepared (step S6), and the prepared response is transmitted (step S7), followed by terminating the process.

Figure 5:
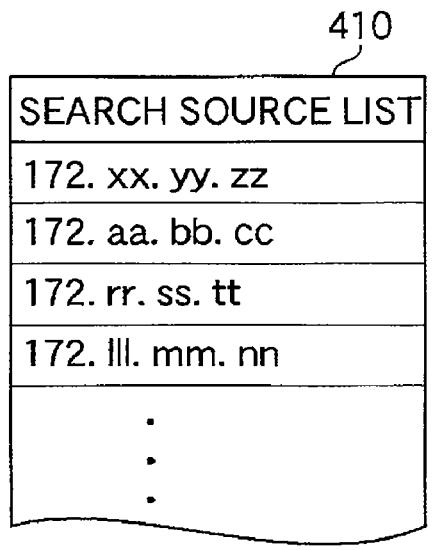
FIG. 5 is a view showing an example of a search source list.

FIG. 5 is a view showing an example of a search source list. In FIG. 5, the search source list 410 registers network addresses of the search sources from which the MFP has received search packets so far. Specifically, the registered network addresses are comprised of 172.xx.yy.zz, 172.aa.b-b.cc, 172.rr.ss.tt, 172.lll.mm.nn, etc.

Figure 6:
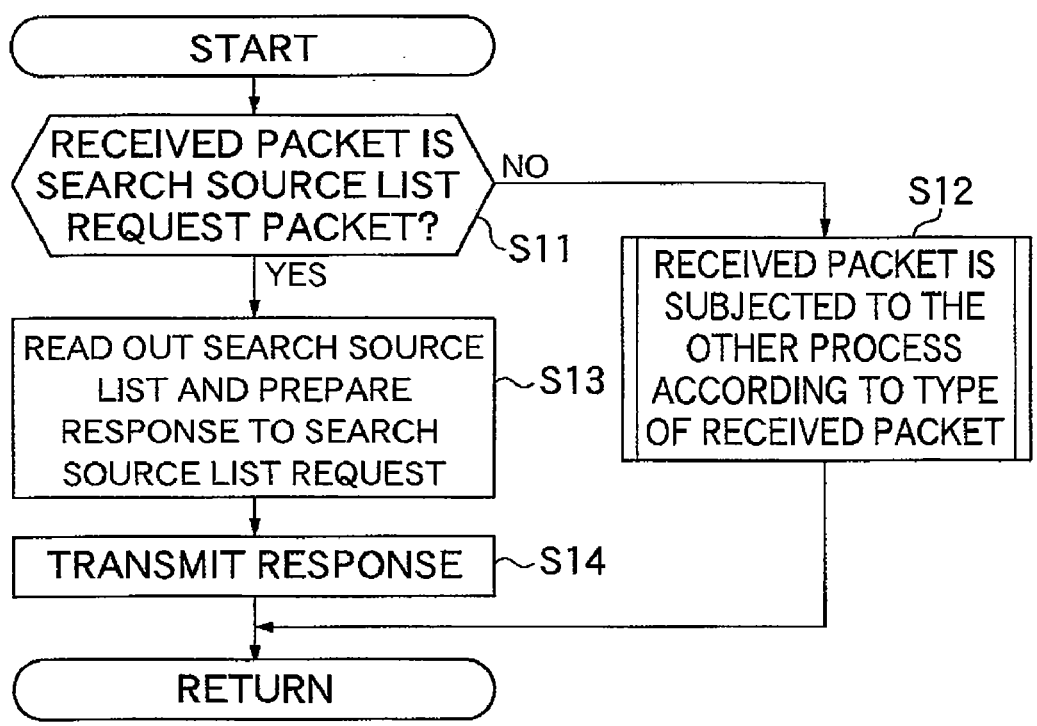
FIG. 6 is a flowchart showing the procedures for carrying out a process for a search source list request packet among the procedures in the step S8 in FIG. 4.

FIG. 6 is a flowchart showing the procedures for carrying out a process for a search source list request packet among the process executed in the step S8 in FIG. 4. The received packets are written into the RAM 308 due to the procedures taken so far. It is also confirmed that the received packets are not the search packets In FIG. 6, first, it is determined whether the received packet is a search source list request packet or not (step S11). When the received packet is not a search source list request packet, the received packet is subjected to the other process according to the type of the received packet (step S12), followed by the process returning to the main flow.

On the other hand, when the packet received in the step 11 is a search source list request packet, the search source list (see FIG. 5) stored in the RAM 308 is read out, a response to the search source list request is prepared (step S13), and the prepared response is transmitted (step S14), followed by the process returning to the main flow.

Figure 7:
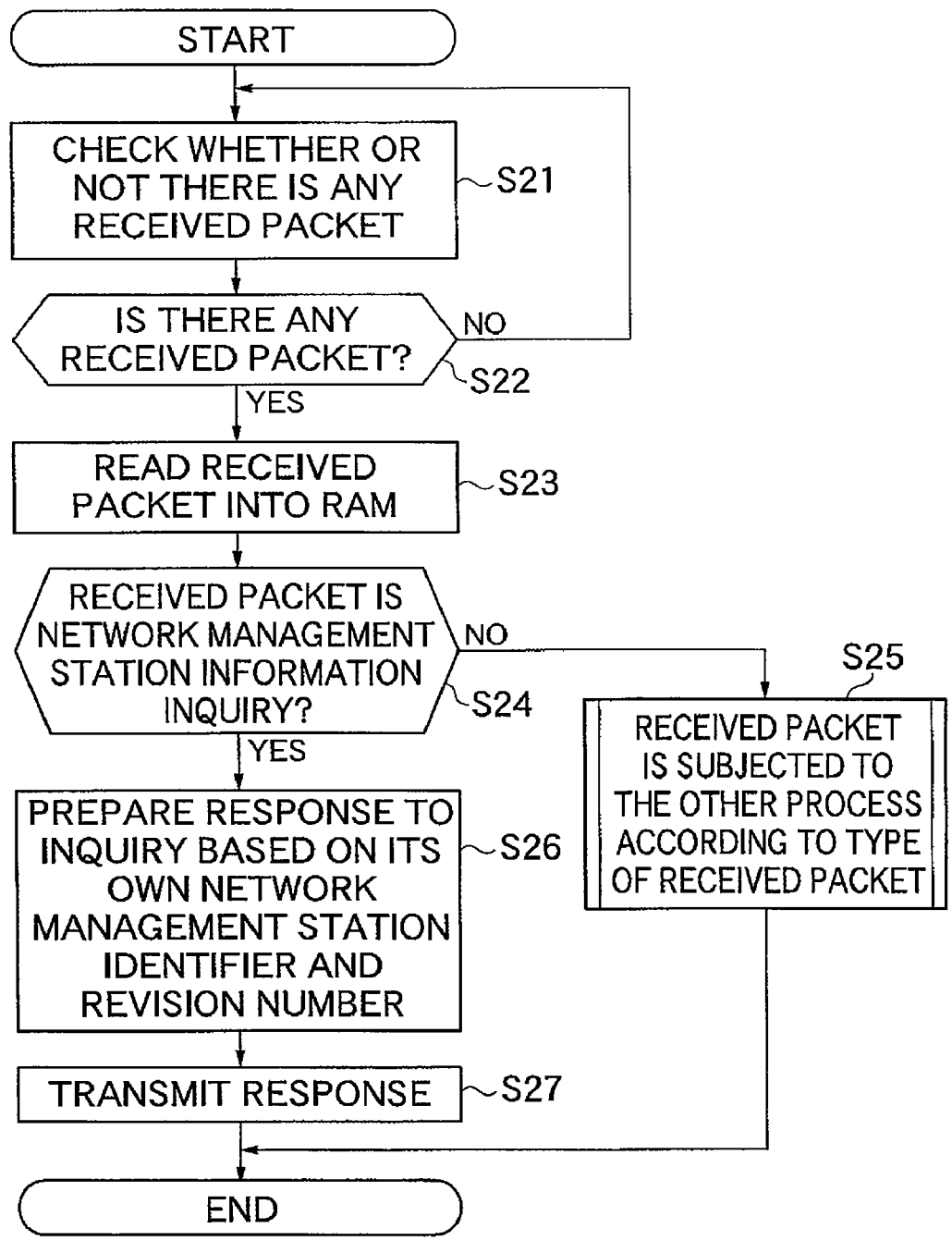
FIG. 7 is a flowchart showing the procedures for carrying out a response process to network management station information inquiry in the network management station.

FIG. 7 is a flowchart showing the procedures for carrying out a response process to a network management station information inquiry in the network management station 106 or 109. The program for the response process is stored in a recording medium (ROM 205, secondary memory 213) in the network management station 106 or 109, and executed by the CPU 203.

In FIG. 7, first, it is checked whether there is any received packet or not (step S21). As a result of the check, it is determined whether there is any received packet or not (step S22). When there is no received packet, the process returns to the step S21.

When there is a packet received in the step S21, the received packet is read into the RAM 206 (step S23). Then, it is determined whether or not the received packet is a network management station information inquiry (step S24) When the received packet is not a network management station information inquiry, the received packet is subjected to the other process according to the type of the received packet (step S25) (subroutine in FIG. 12), followed by terminating the process.

When the received packet is a network management station information inquiry in the step S24, a response to the inquiry is prepared based on its own network management station identifier and revision number (step S26). The response prepared here may include any information by arrangement between the sender and the receiver. However, an identifier necessary for determining whether or not the sender and the receiver have the same type of network management stations is, at least, needed. According to this embodiment, a constant number is preliminarily decided as a network management station identifier, and the response is prepared in such a way that it may include the constant number and the revision number. Then, the prepared response is transmitted (step S27), followed by terminating the process.

Figure 8:
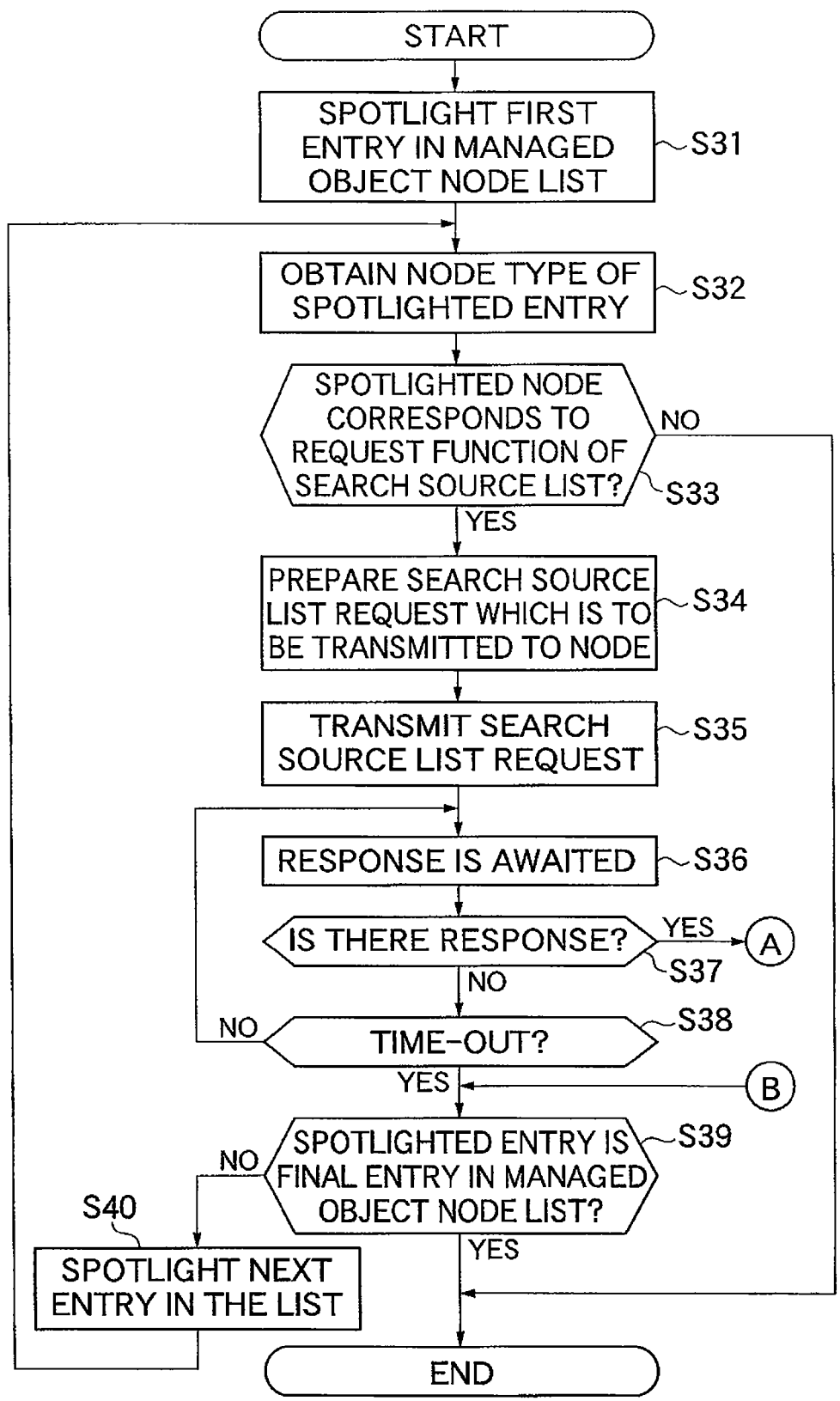
FIG. 8 is a flowchart showing the procedures for carrying out a process of obtaining a search source list in the network management station, and the procedure for carrying out a process of searching another network management station on the same network.
Figure 9:
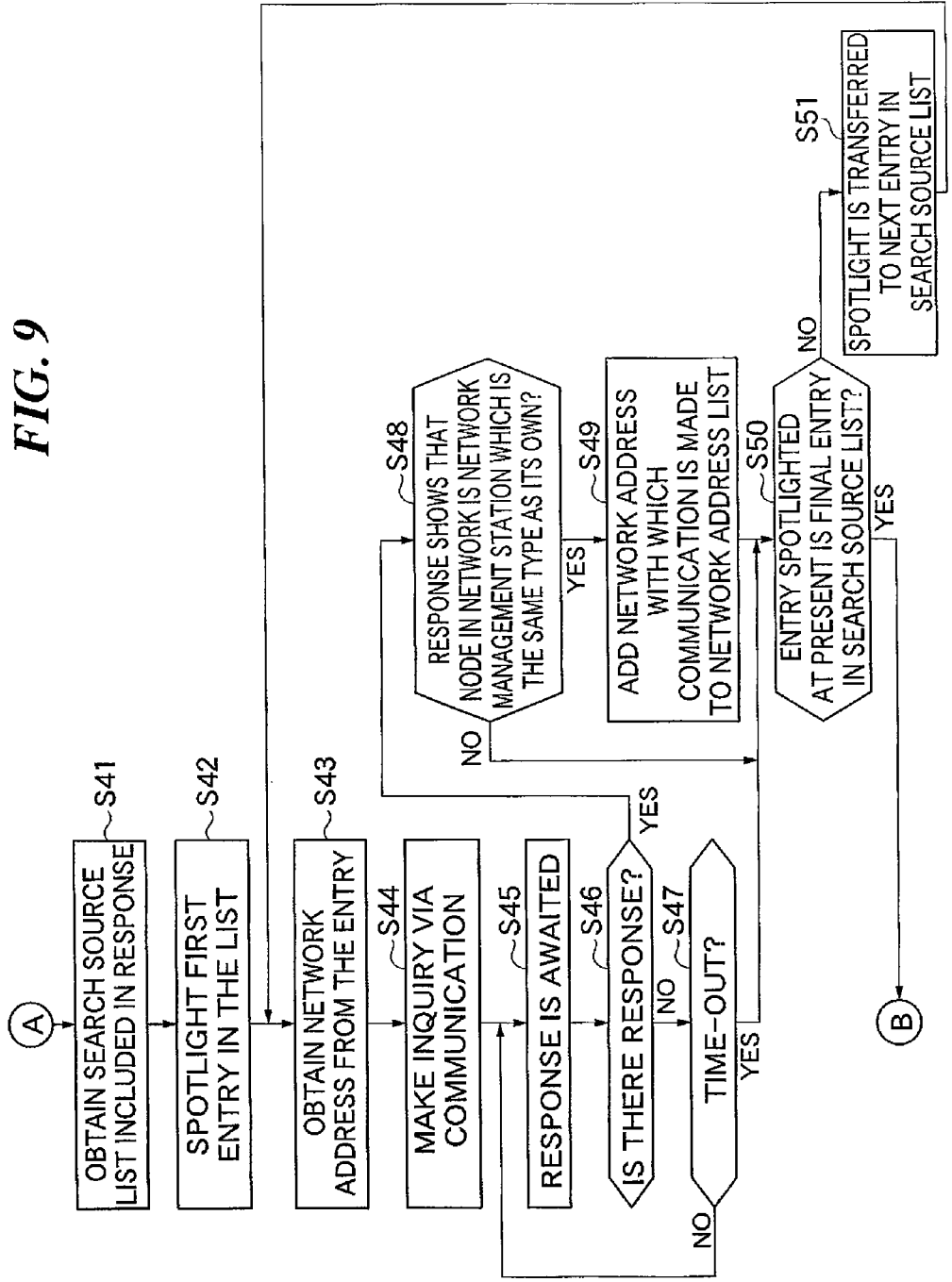
FIG. 9 is a flowchart, continued from FIG. 8, showing the procedures for carrying out a process of obtaining a search source list in the network management station, and the procedures for carrying out a process of searching another network management station on the same network.

FIGS. 8 and 9 are flowcharts showing the procedures for carrying out a process of obtaining a search source list in the network management station 106 or 109, and the procedures for carrying out a process of searching another network management station on the same network. The program for the processes is stored in a recording medium (ROM 205, secondary memory 213) in the network management station 106 or 109, and executed by the CPU 203.

In FIGS. 8 and 9, first, a first entry in its own managed object node list is spotlighted (step S31). FIG. 10 is a view showing an example of the managed object node list. The managed object node list 420 is stored in a predetermined area in the RAM 206 or the secondary memory device 213. The managed object node list 420 registers information such as hardware ID, network address, and type of node. According to this embodiment, the name of a model is simply used as the type of node. However, information on installation of options or the like may be included, if necessary, in addition to the name of a model.

A node type of the spotlighted entry is obtained (step S32), thereby making it possible to determine whether or not the node corresponds to the request function of the search source list. In actuality, it is determined whether or not the spotlighted node corresponds to the request function of the search source list (step S33). When the answer to the question of the step S33 is negative (NO), the process is terminated.

On the other hand, when the node spotlighted in the step S33 corresponds to the request function of the search source list, the search source list request which is to be transmitted to the node is prepared (step S34), and then the search source list request is transmitted (step S35) If the node has no problem, the search source list is to be returned according to the flowchart in FIG. 6 mentioned above, and so the response is awaited (step S36).

It is determined whether or not there is a response (step S37), and then when there is no response, it is determined whether it has become time-out or not (step S38). When it has not become time-out, the process returns to the step S36, and the response is awaited again.

When it has become time-out, it is determined whether the spotlighted entry is a final entry in the managed object node list (step S39). When it is a final entry, the process is terminated, whereas when it is not a final entry, the next entry in the list is spotlighted (step S40), followed by the process returning to the step S32.

On the other hand, when there is a response in the step S37, a search source list included in the response is obtained (step S41), a first entry in the list is spotlighted (step S42), and a network address is obtained from the entry (step S43). Then, it is inquired via communication whether or not a node in this network corresponds to the network management station which is the same type as its own (step S44).

The response is awaited (step S45), and it is determined whether or not there is any response (step S46). When there is no response, it is determined whether or not it has become time-out. When it has not become time-out, the process returns to the step S45, the response is awaited again. On the other hand, when it has become time-out, the process proceeds to a step S50.

On the other hand, when there is a response in the step S46, the response is analyzed, and then it is determined whether or not the response shows that a node in the network is the network management station which is the same type as its own (step S48). When the answer to the question of the step S48 is affirmative (YES), the network address with which communication is made is added to the network address list (network management station list) of the node itself (step S49). The network management station list registers network management stations which are the same type as its own that exist on the same network.

FIG. 11 is a view showing a network management station list. In FIG. 11, the list 430 registers network addresses, and revision numbers of network management stations which are included in the responses and are at the obtained network addresses. The information to be registered in the list may be any piece of information included in the response inquiring whether or not the network management station is the same type as its own; however, it should include at least the network address.

Then, it is determined whether the entry spotlighted at present is a final entry in the search source list (step S50). When it is not a final entry, the spotlight is transferred to the next entry in the search source list (step S51), followed by the process returning to the step S43. On the other hand, when it is a final entry, the process returns to the step S39.

Figure 12:
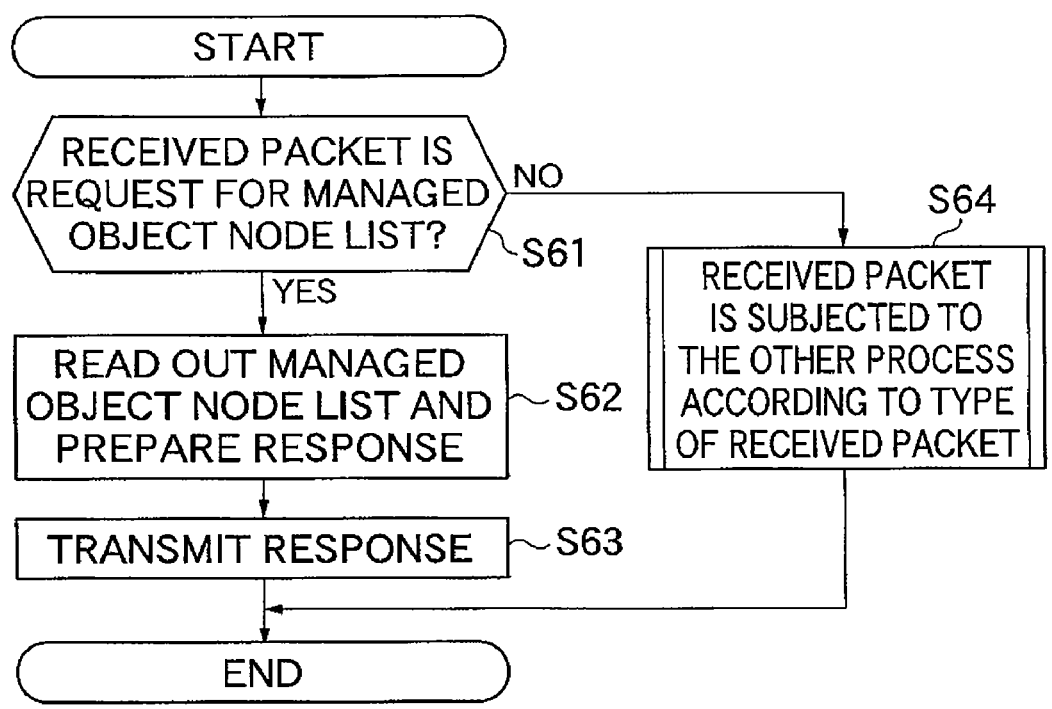
FIG. 12 is a flowchart showing the procedures for carrying out a process of receiving a request for the managed object node list as a process according to the other received packet in the step S25 in FIG. 7.

FIG. 12 is a flowchart showing the procedures for carrying out a process of receiving a request for the management object node list 420 as a process according to the other received packet in the step S25 in FIG. 7.

First, it is determined whether or not the received packet is a request for the managed object node list or not (step S61). When the received packet is a request for the managed object node list, the managed object node list is read out from a predetermined area in the RAM 206 or the secondary memory device 213 to be stored in another area in the RAM 206, and further a response to the request for the received managed object node list is prepared (step S62) and then the prepared response is transmitted (step S63), followed by terminating the process.

On the other hand, when the packet received in the step S61 is not a request for the managed node list, a process according to the other received packet is carried out (step S64) (subroutine in FIG. 12), followed by terminating the process.

Figure 13:
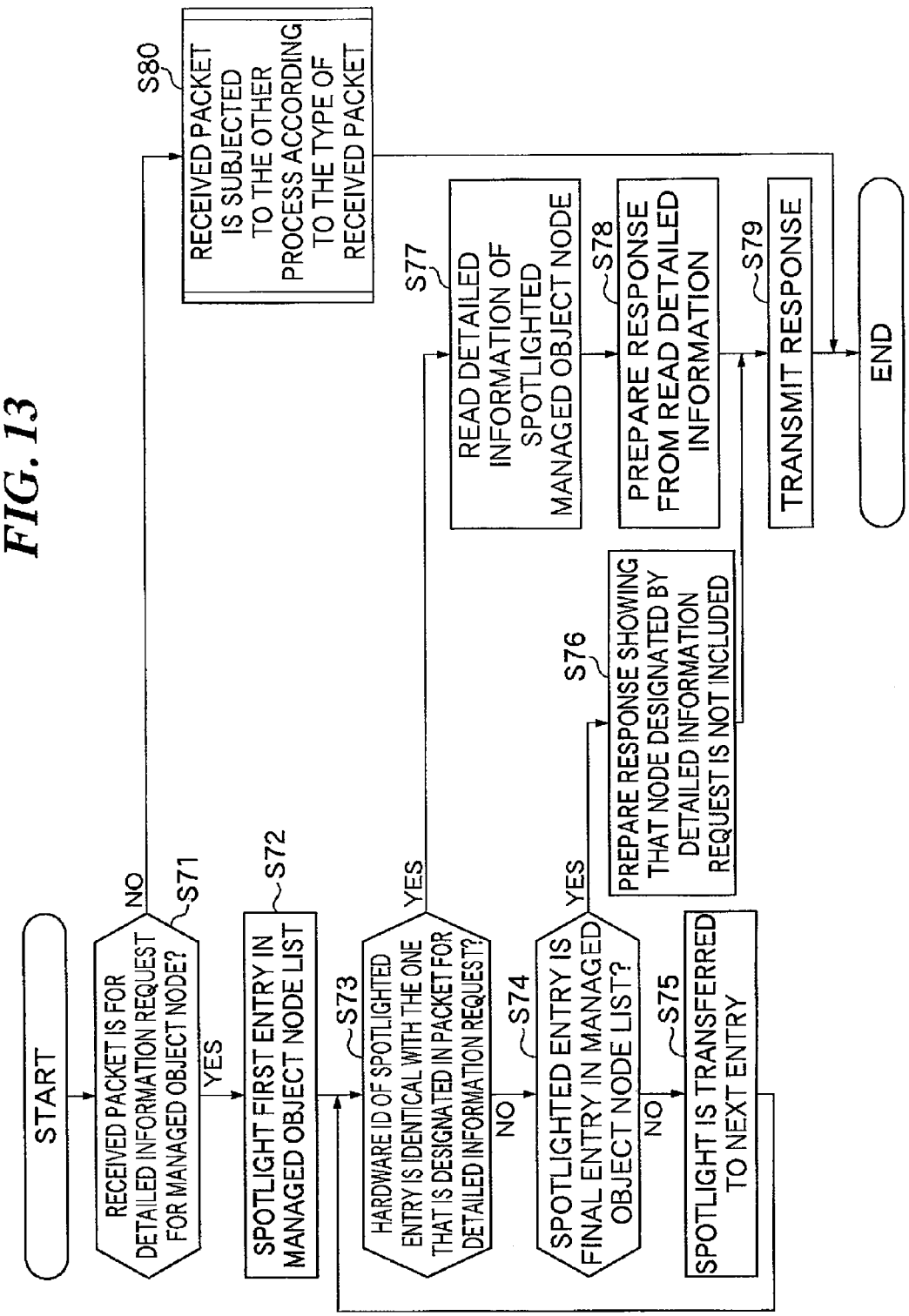
FIG. 13 is a flowchart showing the procedures for carrying out a process of receiving a request for the managed object node list as a process according to the other received packet in the step S64 in FIG. 12.

FIG. 13 is a flowchart showing the procedures for carrying out a process of receiving a detailed information request for the managed object node as a process according to the other received packet in the step S64 in FIG. 12. In FIG. 13, first, it is determined whether or not the received packet is for a detailed information request for the managed object node (step S71).

When the received packet is for the detailed information request for the managed object node, a first entry in the managed object node list 420 stored in the RAM 206 or the secondary memory device 213 is spotlighted (step S72). Then, it is determined whether or not a hardware ID of the spotlighted entry is identical with the one that is designated in the packet for the detailed information request for the managed object node (step S73). Moreover, information to designate a node used in the packet for the detailed information request for the managed object node does not have to be a hardware ID, but may be any information that can define the node uniquely. For example, it may be a network address.

When the hardware ID is determined to be not identical in the step S73, it is determined whether or not the spotlighted entry is the final entry in the managed object node list (step S74). When the spotlighted entry is not the final entry in the managed object node list, the spotlight is transferred to the next entry in the managed object node list (step S75), followed by terminating the process returning to the step S73.

When the spotlighted entry is the final entry in the step S74, a response showing that the managed object node list does not include a node designated by the detailed information request for the managed object node is prepared (step S76), followed by the process proceeding to a step S79.

When the hardware ID of the entry spotlighted in the step S73 is identical with the one that is designated in the packet for the detailed information request for the managed object node, the detailed information of the spotlighted managed object node is read into the RAM 206 (step S77), a response is prepared from the read detailed information (step S78), and then the response prepared in the step S76 or step S78 is transmitted (step S79), followed by terminating the process.

When the received packet is not for a detailed information request for the managed object node, the received packet is subjected to the other process according to the type of the received packets (step S80), followed by terminating the process.

Figure 14:
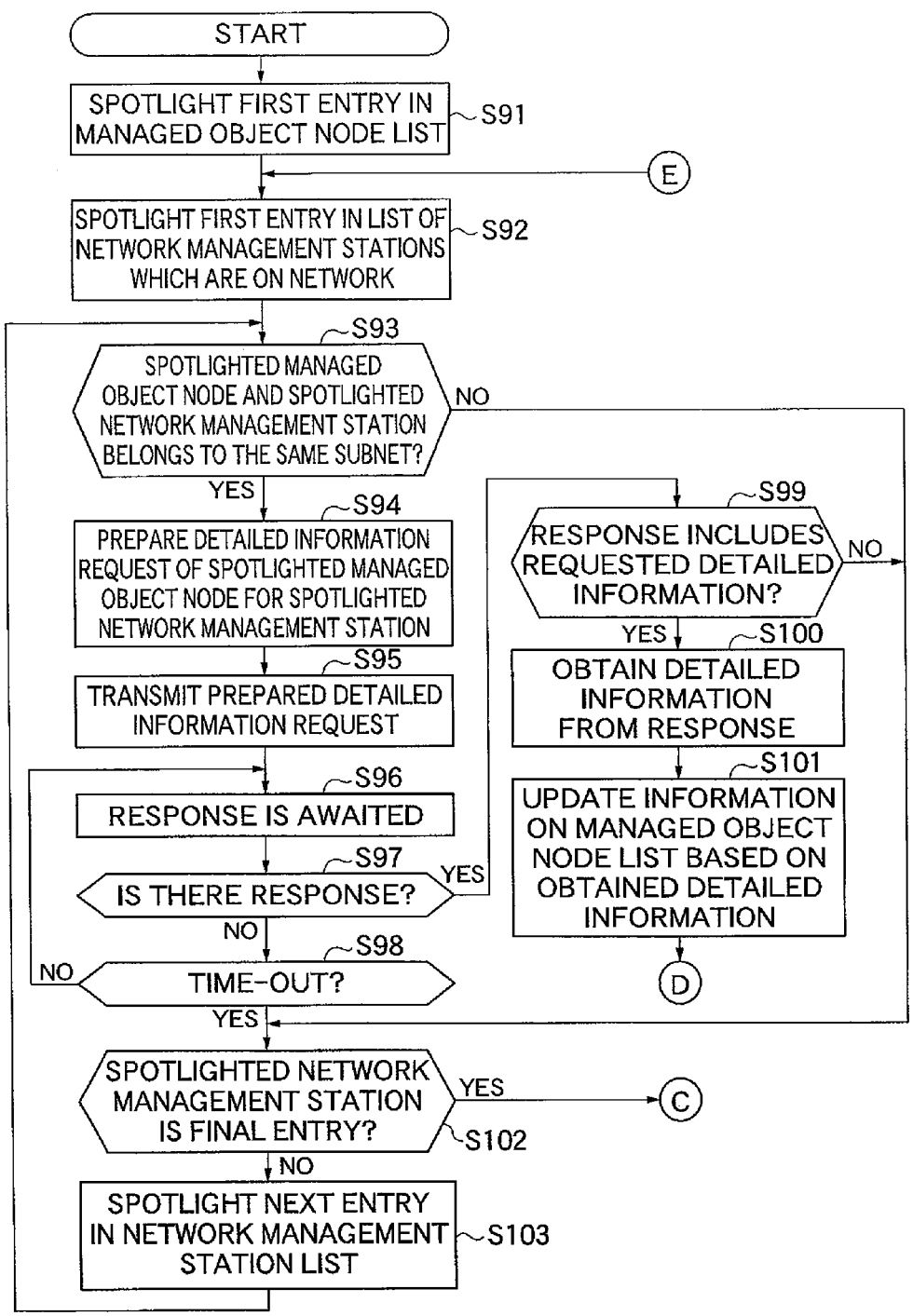
FIG. 14 is a flowchart showing the procedures for carrying out a process of collecting information on the managed object nodes in the network management station.
Figure 15:
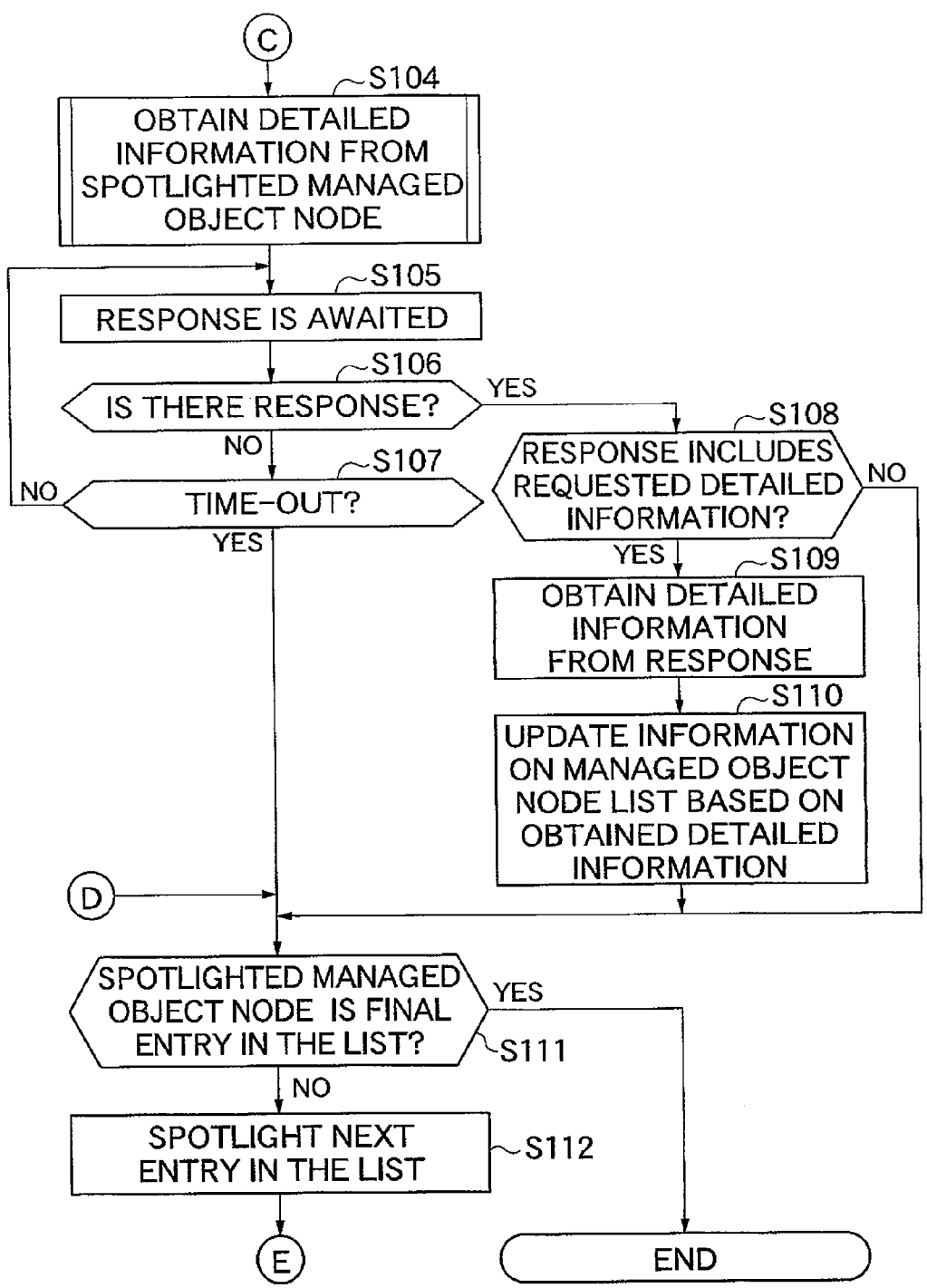
FIG. 15 is a flowchart, continued from FIG. 14, showing the procedures for carrying out a process of collecting information on the managed object nodes in the network management station.

FIGS. 14 and 15 are flowcharts showing the procedures for carrying out a process of collecting information on the managed object nodes in the network management station 106 or 109. The program for the process is stored in the recording medium (ROM 205, secondary memory device 213), and executed by the CPU 203.

In FIG. 14, first, a first entry in the managed object node list is spotlighted (step S91), and then a first entry in a list of the network management stations which are on the network and the same type as its own is spotlighted (step S92).

Then, it is determined whether or not the spotlighted managed object node and the spotlighted network management station belong to the same subnet (step S93). When they belong to the subnet, a detailed information request of the spotlighted managed object node is prepared for the spotlighted network management station (step S94), and then the prepared detailed information request is transmitted (step S95). Then, the response is awaited (step S96).

Next, it is determined whether or not there is a response to the detailed information request (step S97). When there is no response, it is determined whether it has become time-out or not (step S98). When it does not become time-out, the process returns to the step S96, and the response is further awaited. On the other hand, when it has become time-out, the process proceeds to the step S102.

When there is a response in the step S97, it is determined whether or not the response includes the requested detailed information (step S99). When the response includes the requested detailed information, the detailed information is obtained from the response (step S100), and then information on the managed object node list is updated based on the obtained detailed information (step S101), followed by the process proceeding to the step S111.

When the response does not include the detailed information in the step S97, or it has become time-out in the step S98, it is determined whether or not the spotlighted network management station is the final entry (step S102). When it is not the final entry, the spotlight is transferred to the next entry in the network management station (step S103), followed by the process returning to the step S93.

When the network management station spotlighted in the step S102 is the final entry, the direct communication is made to the spotlighted managed object node to obtain the detailed information (step S104). Then, the response is awaited (step S105), and it is determined whether or not there is received a response (step S106).

When there is not received a response, it is determined whether or not it has become time-out (step S107). When it does not become time-out, the process returns to the step S105, whereas it has become time-out, the process proceeds to the step S111. In this case, the information on the managed object node is not obtained, and the information on the managed object node list is not updated either.

When the response is received in the step S106, it is determined whether or not the response includes the requested detailed information (step S108). When the response includes the request detailed information, the detailed information included in the response is obtained (step S109), and then the information on the managed object node list is updated based on the obtained detailed information, followed by the process proceeding to the step S111.

When the response does not include the requested detailed information in the step S108, the process proceeds to the step S111. In this case, the information on the managed object node is not obtained, and the information on the managed object node list is not updated either.

Meanwhile, when the information is updated in the S101, the information is updated in the step 110, it has become time-out in the step S107, or the response does not include the requested detailed information in the step S108, the process proceeds to the step S111. At this stage, the information of the spotlighted managed object node is already obtained and updated, or it has become definite that the detailed information is not obtained.

Then, it is determined whether the spotlighted managed object node is the final entry in the list (step S111). When it is the final entry, the process is terminated, whereas when it is not the final entry, the spotlight is transferred to the next entry in the managed object node list (step S112), followed by the process returning to the step S92.

Figure 16:
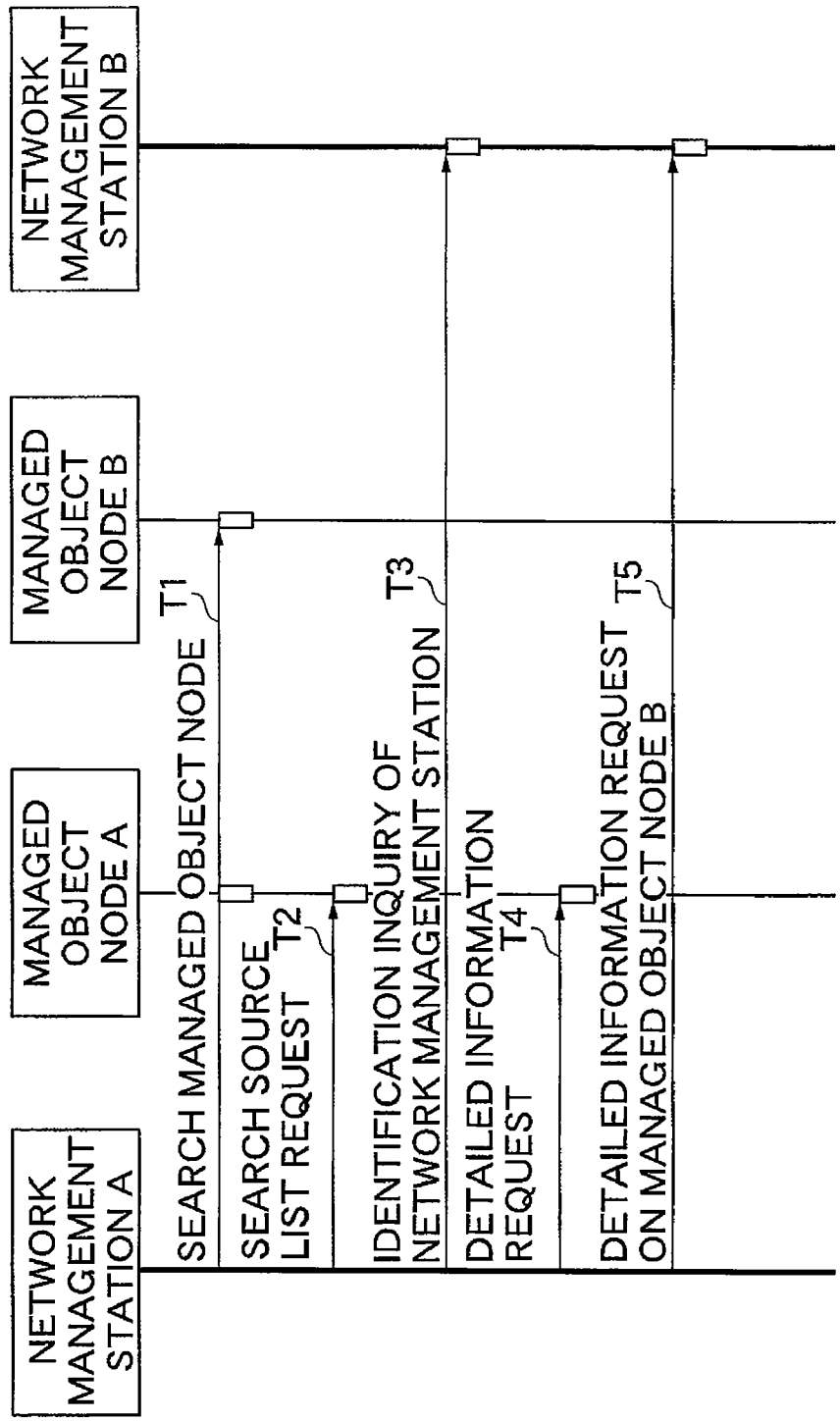
FIG. 16 is a view showing the flow of the entire process in the network management system.

FIG. 16 is a view showing the flow of the entire process in the network management system. In this context, the network management station A or B corresponds to the network management station 106 or 109, respectively. Furthermore, the managed object node A is in the same network segment as the network management station A, and corresponds to any one of the MFPs 104, 105, and 107. Likewise, the managed object node B is in the same network segment as the network management station B, and corresponds to any one of the MFPs 110 and 111.

First of all, the network management station A searches the managed object node (T1). This search is an operation to find out the managed object node in the entire network system. When any one of the managed object node A or the managed object node B responds to the search, both nodes are registered in the managed object node list of the network management station A.

The network management station A sends a search source list request to the management node A (T2). Meanwhile, it is supposed to be apparent at the time of the search (see T1) that the managed object node A corresponds to a function of the search source list request. Because the managed object node A has been searched by the network management station B, it has accumulated the information, and the information is communicated to the network management station A.

When the network management station A receives the information, it sends an identification inquiry of the network management station to the network management station B (T3). On the other hand, the network management station B has a function of identification inquiry, and sends back its own identifier and revision number. Thereby, the network management station A becomes aware that the network management station B is the same type of network management station as the network management station A.

At this moment, the network station A becomes aware that the managed object nodes A and B, and the network management station B exist, and further, it becomes aware from the network address that the managed object node B and the network management station B belong to the same subnet. Furthermore, it also becomes aware that the managed object A belongs to a different subnet from that of the network management station B.

Therefore, the network management station A sends, at the stage of obtaining the detailed information on the following respective managed object nodes, the detailed information request directly to the managed object mode A, and obtains the detailed information therefrom (T4). On the other hand, the network management station A requests the detailed information on the managed object node B to the network management station B (T5), and obtains the detailed information therefrom.

Figure 17:
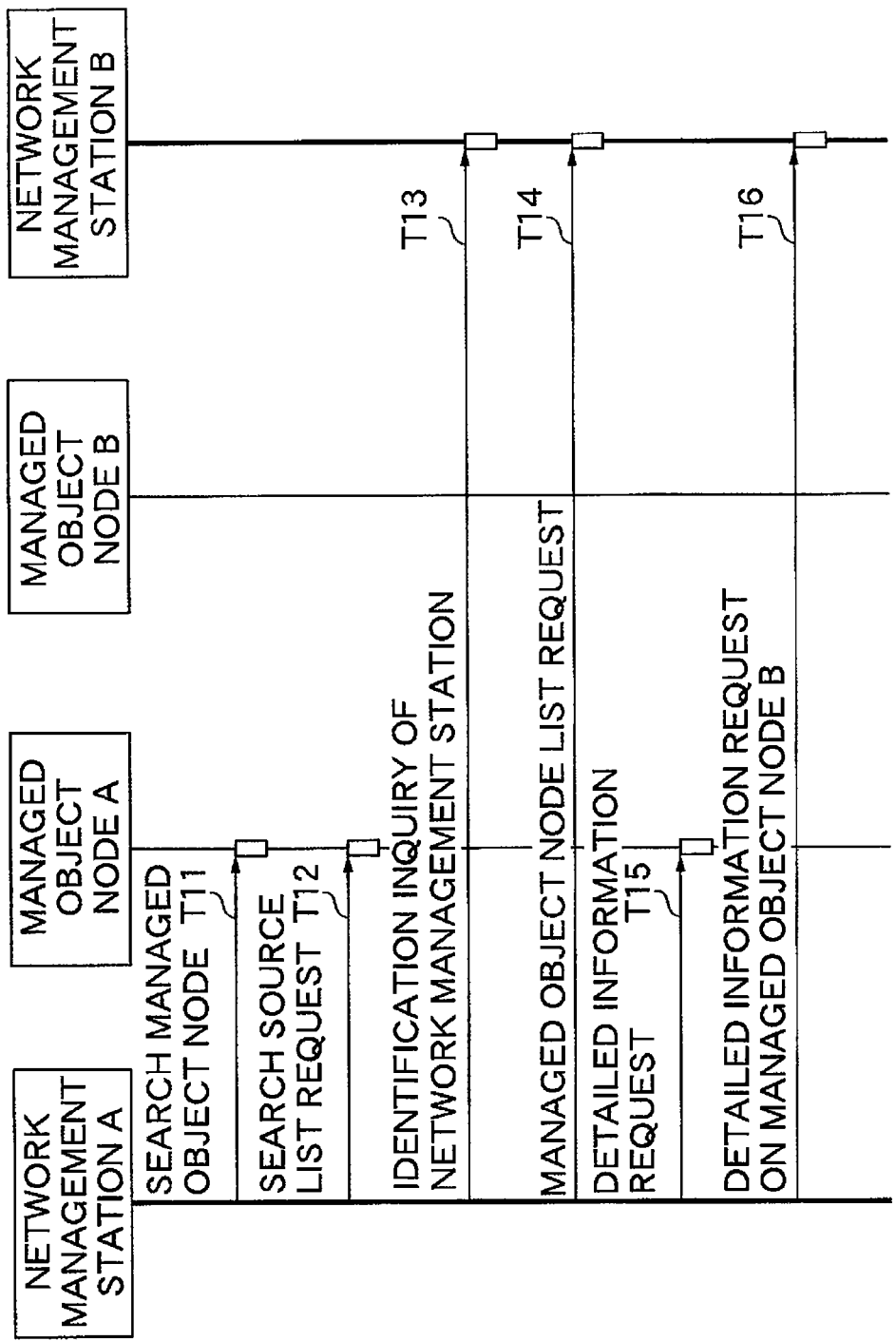
FIG. 17 is a view showing the flow of the other entire process in the network management system.

FIG. 17 is a view showing the flow of the other entire process in the network management system. The network managed stations A and B, and the managed object nodes are the same as those in FIG. 16.

First of all, the network management station A searches for the management object node (T11). In this context, it is supposed that the search unit used by the network management station cannot reach the managed object node B of the subnet which has a different search manner. Therefore, it is supposed that the response is transmitted to the network management station only from the managed object node A. At this moment, the network management station A does not recognize that the management object node B does not exist.

The network management station A sends the search source list request to the management object node A, and obtains the search source list (T12). Because the management object node A has been searched for by the network management station B, the network address of the network management station B is registered in the search source list.

The network management station A sends an inquiry for identification of the network management station to the network management station B based on the network address (T13).

After the network management station A becomes aware that the network management station B is the same type of network management station, it requests the managed object node list (T14). The managed object node B is registered in the managed object node list included in the response.

The network management station A directly sends the detailed information request to the managed object node A whose existence is apparent to obtain the detailed information (T15), whereas it requests the detailed information of the managed object node B to the network management station B to obtain the detailed information (T16).

In FIG. 17, the managed object node B is not reached by the search unit of the network management station A, and is supposed to be connected to a position whose network cost is so high that the direct communication is impossible. Even in such a case, the network management station A can make the managed object node B a managed object by requesting the detailed information to the network management station B. Therefore, when such managed nodes as the managed object node B increases in number, it is possible to decrease the management cost of the network by cooperation of the network management station A and the network management station B.

Thus, according to the network management system of the first embodiment of the present invention, each of the network management stations can easily find the same type of network management stations as its own that exist on the same network, thereby eliminating the need for using a high network cost search method such as a conventional search method.

In this case, at least one of the managed object nodes 104, 105, 107, 110, and 111 has a function of recording the search source list and a function of responding to the search source list request. Each of the network management station 106 and 109 has a function of requesting the search source list and a function of holding a list of the same type of network management stations as its own that exist on the same network. Furthermore, it has a function of inquiring the type of network management stations and its response function, a function of requesting the managed object node list and its response function, and a function of requesting the detailed information of the managed object node and its response function, and the like.

In a situation where there are a plurality of the network management stations, by exchanging the information of the managed object node held by the respective network management, it possible to obtain and manage the information without communicating directly with the managed object node, which realizes the highly efficient network management without increasing the network traffic beyond necessity as a whole network management system.

The search source list of FIG. 5 in each of the MFPs may register time when the search is performed, in addition to the network addresses of the network management station.

Each of the network management station may transmit the managed object node list managed by the network management station itself to another network management station. The network management station that receives the managed object node list from another network management station may work out and manage a list of sum of sets with its own managed object node list.

As for each entry in the managed object node list in FIG. 10, each of the network management station may manage information showing the hop count in the case of communication with the managed object node. In this context, the hop count is information showing how many routers are traversed in order to communicate with an object device. The information is also transmitted when the managed object node list is transmitted to another network management station.

As for each entry in the managed object node list in FIG. 10, each of the network management station determines which gives lower load to the network for the network management station itself to manage the managed object node through direct network communication, or for the same type of another network management station to manage through communication. When it is determined to give lower load to the network for the network management station itself to manage the managed object node through direct network communication, information indicating it is added to the entry in the managed object node list. On the other hand, when it is determined to give lower load to the network for the same type of another network management station to manage through communication, information indicating it is added to the entry in the managed object node list. When the managed object node list is transmitted to another network management stations, the above information may be transmitted simultaneously.

The network management system according to a second embodiment of the present invention will be described below.

According to the first embodiment of the present invention, when the managed object node receives a packet determined to be a search packet, it adds the transmitter of the packet to the search source list unconditionally. On the contrary, according to the second embodiment of the present invention, when the managed object node adds the transmitter to the managed object node, it verifies a hardware ID of the transmitter.

The construction of the network management system according to the second embodiment is identical with that of the network management system according to the first embodiment; therefore, the identical reference numerals are used for corresponding elements and parts and hence the description thereof is omitted. The internal construction of the network management station and the internal construction of the managed object node, namely the MFP are identical with those of the first embodiment; therefore, the identical reference numerals are used for corresponding elements and parts and hence the description thereof is omitted.

Figure 18:
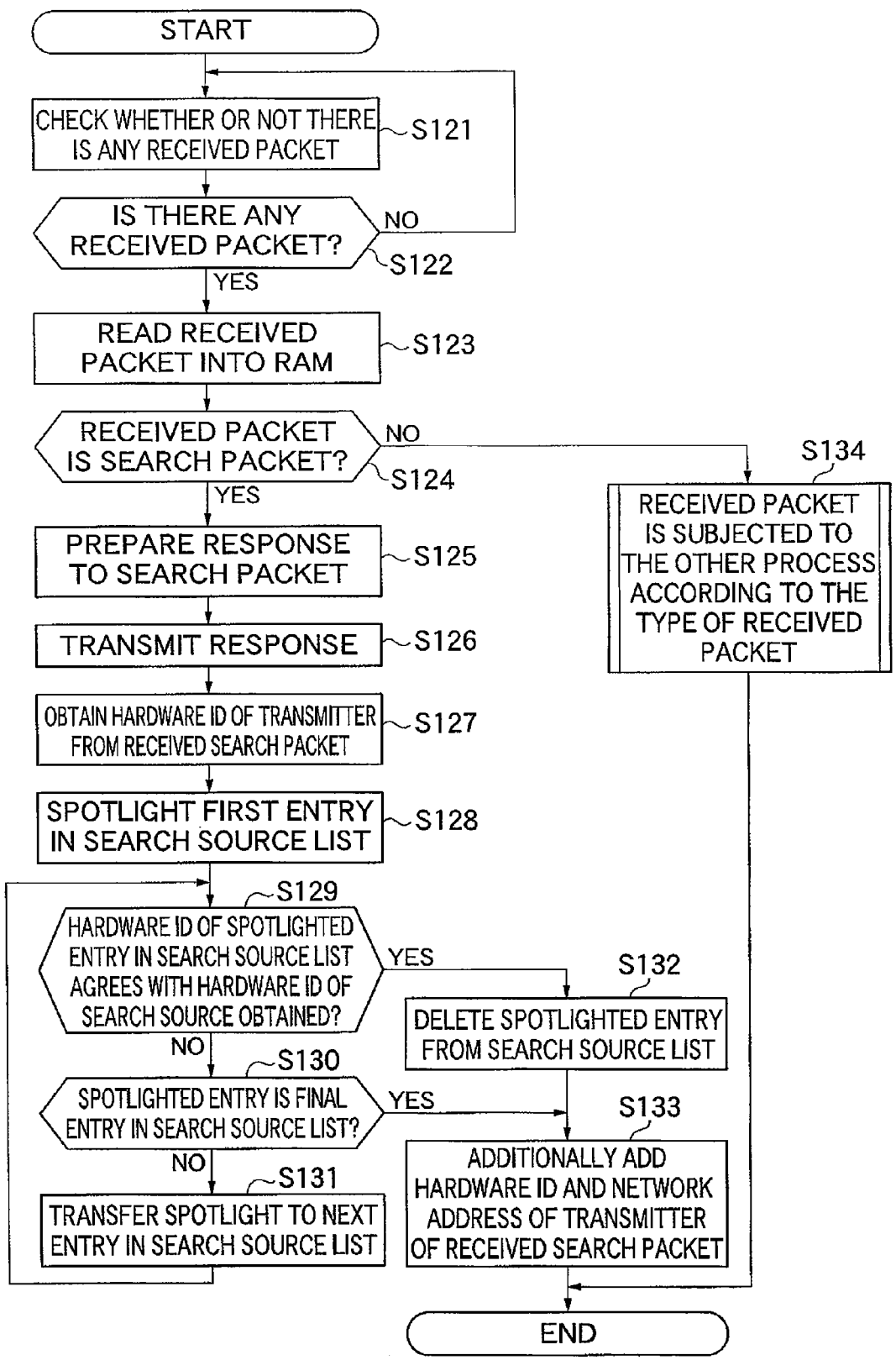
FIG. 18 is a flowchart showing the procedures for carrying out a process of receiving the search packet in the network controller in the managed object node, namely the MFP according to a second embodiment of the present invention.

FIG. 18 is a flowchart showing the procedures for carrying out a process of receiving the search packet in the network controller 303 in the managed object node, namely the MFP according to the second embodiment of the present invention. The program for the process is stored in the ROM 307, and executed by the CPU 305.

In FIG. 18, first of all, it is checked whether there is any received packet or not (step S121). As a result of the check, it is determined whether there is any received packet or not (step S122). When there is no received packet, the process returns to the step S121, whereas when there is a received packet, the received packet is read into the RAM 308 (step S123).

Then, it is determined whether the received packet is a search packet or not (step S124). When the received packet is not a search packet, the received packet is subjected to the other process according to the type of the received packet (step S134), followed by terminating the process.

On the other hand, when the received packet is a search packet, a response to the search packet is prepared (step S125), and the prepared response is transmitted (step S126).

Thereafter, a hardware ID of the transmitter is obtained from the received search packet (step S127), the first entry in the search source list held by itself is spotlighted (step S128), and then it is determined whether or not the hardware ID of the spotlighted entry in the search source list agrees with the hardware ID of the search source obtained in the step S127 (step S129).

When it does not agree, it is determined whether or not the spotlighted entry in the search source list is a final entry in the search source list (step S130). When it is not a final entry, the spotlight is transferred to the next entry in the search source list (step S131), followed by the process returning to the step S129.

In the question of the step S129, when the hardware ID of the spotlighted entry in the search source list agrees with the hardware ID of the search source in the search packet, the spotlighted entry is deleted from the search source list (step S132), and then the hardware ID and the network address of the transmitter of the received search packet are additionally added to the search source list (step S133), followed by terminating the process.

In the question of the step S130, when the spotlighted entry in the search source list is a final entry in the search source list, the process of the step S133 is carried out likewise.

FIG. 19 is a table showing an example of the search source list held by the managed object node. The search source list 510 registers network addresses and hardware IDs with which the managed object nodes (MFPs) have received search packets from the search source so far. Specifically, the registered hardware IDs are comprised of "0XXX0DF080B73, 0YXY390CF0991, 0ZYX6FA10BB96, etc." and the registered network addresses "are comprised of 172.xx.yy.zz, 172.aa.bb.cc, 172.rr.ss.tt, etc.".

The other processes in the network management system according to the second embodiment are the same as those according to the first embodiment. Namely, the process of the managed object node receiving the search source list request is the same as the process shown in FIG. 6. The process of the network management station responding to the network management station inquiry is the same as the process shown in FIG. 7. The process of the network management station finding another network management station is the same as the process shown in FIGS. 8 and 9. The managed object node list held by the network management station is the same as the list shown in FIG. 10. The list of the same type of the network management station as its own that exists on the network is the list shown in FIG. 11. The process of receiving the managed object node list request is the same as the process shown in FIG. 12. The process of receiving the detailed information request of the managed object node is the same as the process shown in FIG. 13. The process of the network management station collecting the information of the managed object node is the same as the process shown in FIGS. 14 and 15. The flows of the entire process in the network management system are the same as those which are shown in FIGS. 16 and 17.

According to the network management system of the second embodiment, verifying the hardware ID of the transmitter prevents the same transmitters from being doubly registered in the search source list. As a result, when carrying out the process of inquiring about the existence of the network management station (see FIG. 8 and FIG. 9), it is possible to decrease the probability of making a plurality of inquiries to the same network management station, thereby decreasing the network traffic compared with the first embodiment to increase the management efficiency.

A network management system according to a third embodiment will be described below.

According to the second embodiment, verifying the hardware ID of the transmitter prevents the same transmitter from being doubly registered in the search source list. The network management system according to the third embodiment is characterized by registering the transmitters, which are different in search manner from one another, separately in the search source list.

The construction of the network management system according to the third embodiment is identical with that of the network management system according to the first embodiment; therefore, the identical reference numerals are used for corresponding elements and parts and hence the description thereof is omitted. The internal construction of the network management station and the internal construction of the managed object node, namely the MFP are identical with those of the first embodiment; therefore, the identical reference numerals are used for corresponding elements and parts and hence the description thereof is omitted.

Figure 20:
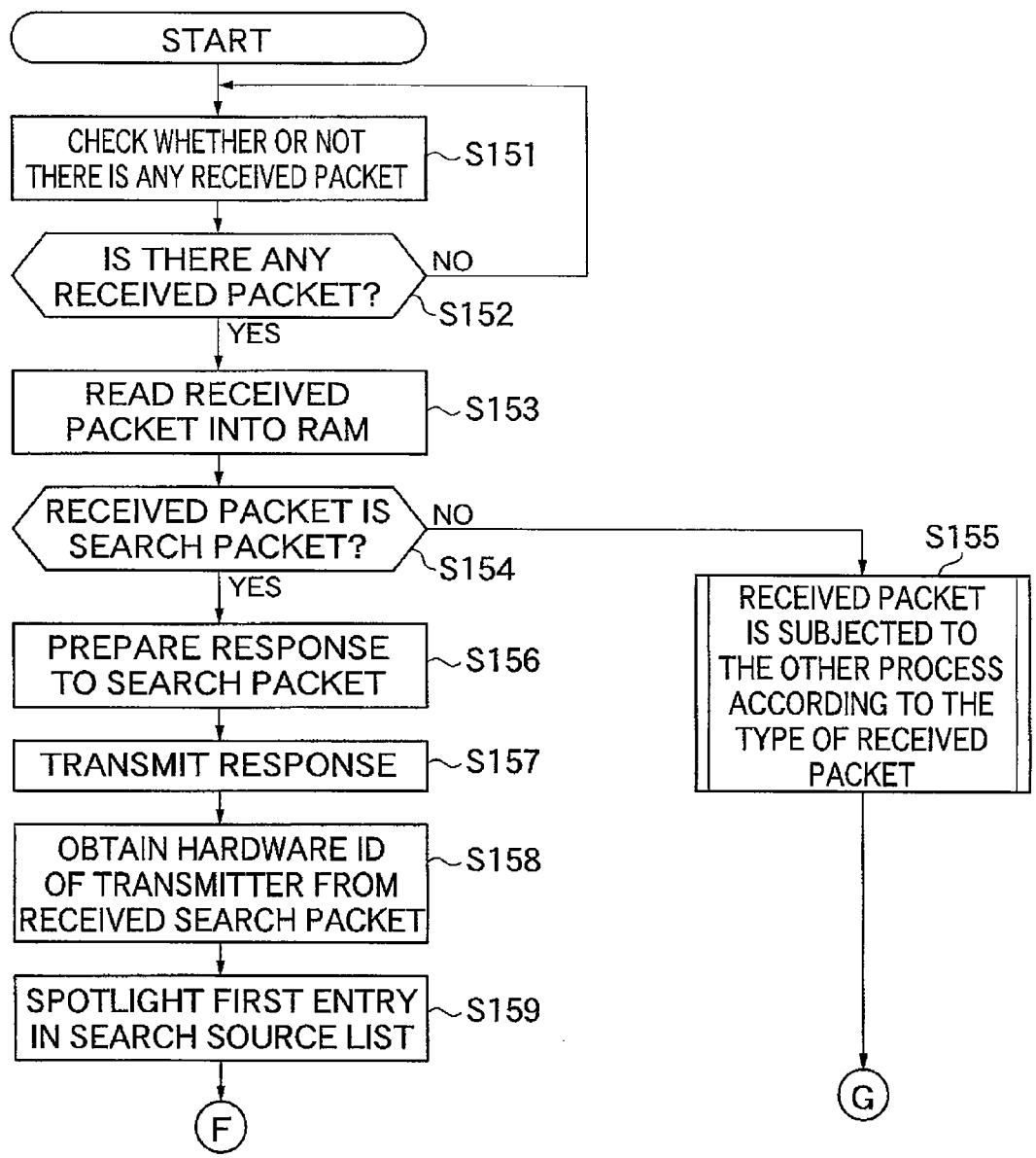
FIG. 20 is a flowchart showing the procedures for carrying out a process of receiving the search packet in the network controller in the managed object node, namely the MFP according to a third embodiment of the present invention.
Figure 21:
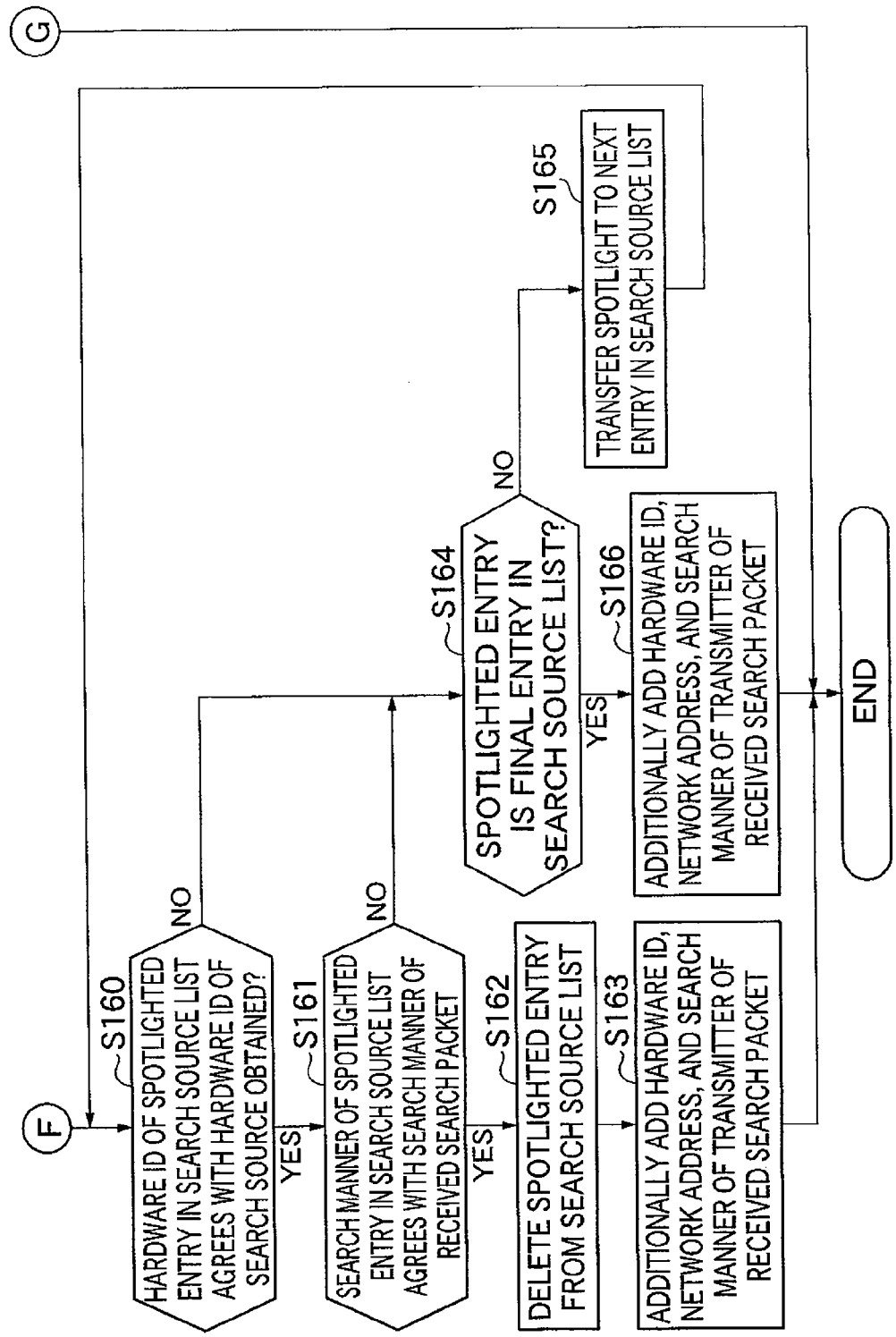
FIG. 21 is a flowchart, continued from FIG. 20, showing the procedures for carrying out a process of receiving the search packet in the network controller in the managed object node, namely the MFP.

FIGS. 20 and 21 are flowcharts showing the procedures for carrying out a process of receiving the search packet in the network controller 303 in the managed object node, namely the MFP according to the third embodiment of the present invention. The program for the process is stored in the ROM 307 in the network controller 303, and is executed by the CPU 305.

In FIG. 20, first of all, it is checked whether there is any received packet or not (step S151). As a result of the check, it is determined whether there is any received packet or not (step S152). When there is no received packet, the process returns to the step S151, whereas when there is a received packet, the received packet is read into the RAM 308 (step S153).

Then, it is determined whether the received packet is a search packet or not (step S154). When the received packet is not a search packet, the received packet is subjected to the other process according to the type of the received packet (step S155), followed by terminating the process.

On the other hand, when the received packet is a search packet, a response to the search packet is prepared (step S156), and the prepared response is transmitted (step S157).

Thereafter, a hardware ID of the transmitter is obtained from the received search packet (step S158), the first entry in the search source list held by itself is spotlighted (step S159), and then it is determined whether or not the hardware ID of the spotlighted entry in the search source list agrees with the hardware ID of the search source obtained in the step S127 (step S160).

When it agrees, it is determined whether or not the search manner registered in the spotlighted entry in the search source list agrees with the search manner of the received search packet (step S161). When it agrees, the spotlighted entry is deleted from the search source list (step S162). The hardware ID, the network address, and the search manner of the transmitter in the received search packet are added to the search source list (step S163), followed by terminating the process.

On the other hand, when the hardware ID does not agree in the step S160, or the search manner does not agree in the step S161, it is determined whether or not the spotlighted entry in the search source list is a final entry in the search source list (step S164). When it is not a final entry, the spotlight is transferred to the next entry in the search source list (step S165), followed by the process returning to the step S160. Meanwhile, when it is a final entry, the hardware ID, the network address, and the search manner of the transmitter in the received packet are added to the search source list (step S166), followed by terminating the process.

FIG. 22 a table showing an example of the search source list held by the managed object node. The search source list 550 registers network addresses, hardware IDs, and search manners with which the managed object nodes (MFPs) have received the search packets from the search source so far. Specifically, the registered hardware IDs are comprised of "0XXX0DF080B73, 0YXY390CF0991, 0ZYX6FA10BB96, etc.", the network addresses in response to the hardware IDs are comprised of "172.xx.jj.zz, 172.aa.b-b.cc, 172.rr.ss.tt, etc.", and then the search manners in response to the hardware ID are comprised of "broadcast, unicast, multicast, unicast, broadcast, etc.". As is distinct from the second embodiment, this search source list includes entries which are different only in a search manner from each other and identical in a hardware ID and a network address with each other, specifically, the hardware ID "0YXY390CF0991" and the network address "172.aa.b-b.cc".

In the network management system according to the third embodiment, the same procedures as those of the first embodiment are as follows. Namely, the process of the managed object node receiving the search source list request is the same as the process shown in FIG. 6. The process of the network management station responding to the network management station inquiry is the same as the process shown in FIG. 7. The process of the network management station finding another network management station is the same as the process shown in FIGS. 8 and 9. The managed object node list held by the network management station is the same as the list shown in FIG. 10. The list of the same type of the network management station as its own that exists on the network is the list shown in FIG. 11. The process of receiving the management object node list request is the same as the process shown in FIG. 12. The process of receiving the detailed information request of the management object node is the same as the process shown in FIG. 13. The flows of the entire process in the network management system are the same as those which are shown in FIGS. 16 and 17.

FIGS. 23, 24, 25 and 26 are flowcharts showing the procedures for carrying out a process of the network management station collecting information on the managed object nodes. The program for the process is stored in recording medium (ROM 205 and secondary memory device 213), and is executed by the CPU 203.

Figure 23:
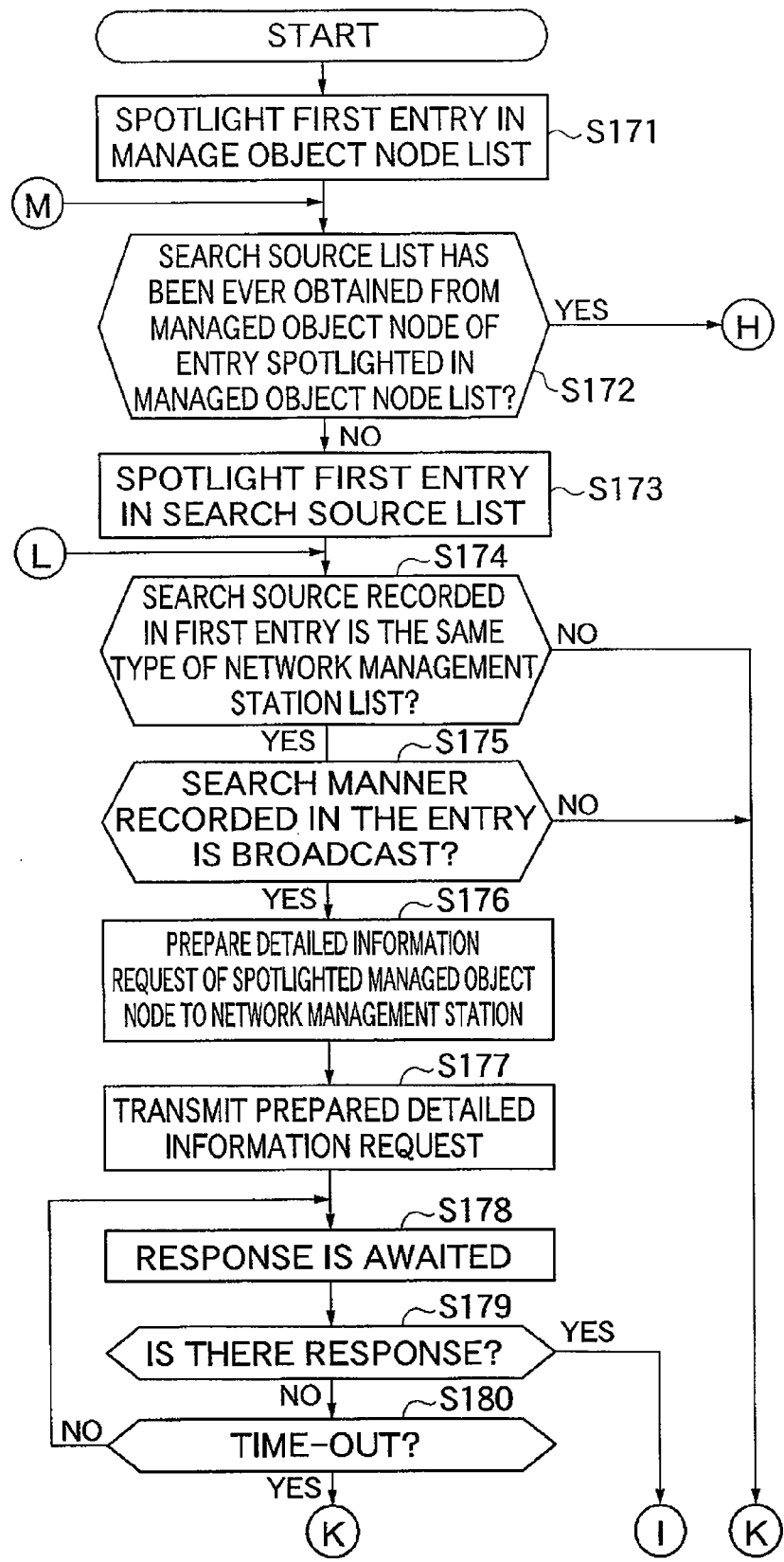
FIG. 23 is a flowchart showing the procedures for carrying out a process of collecting information on the management object nodes in the network management station.
Figure 24:
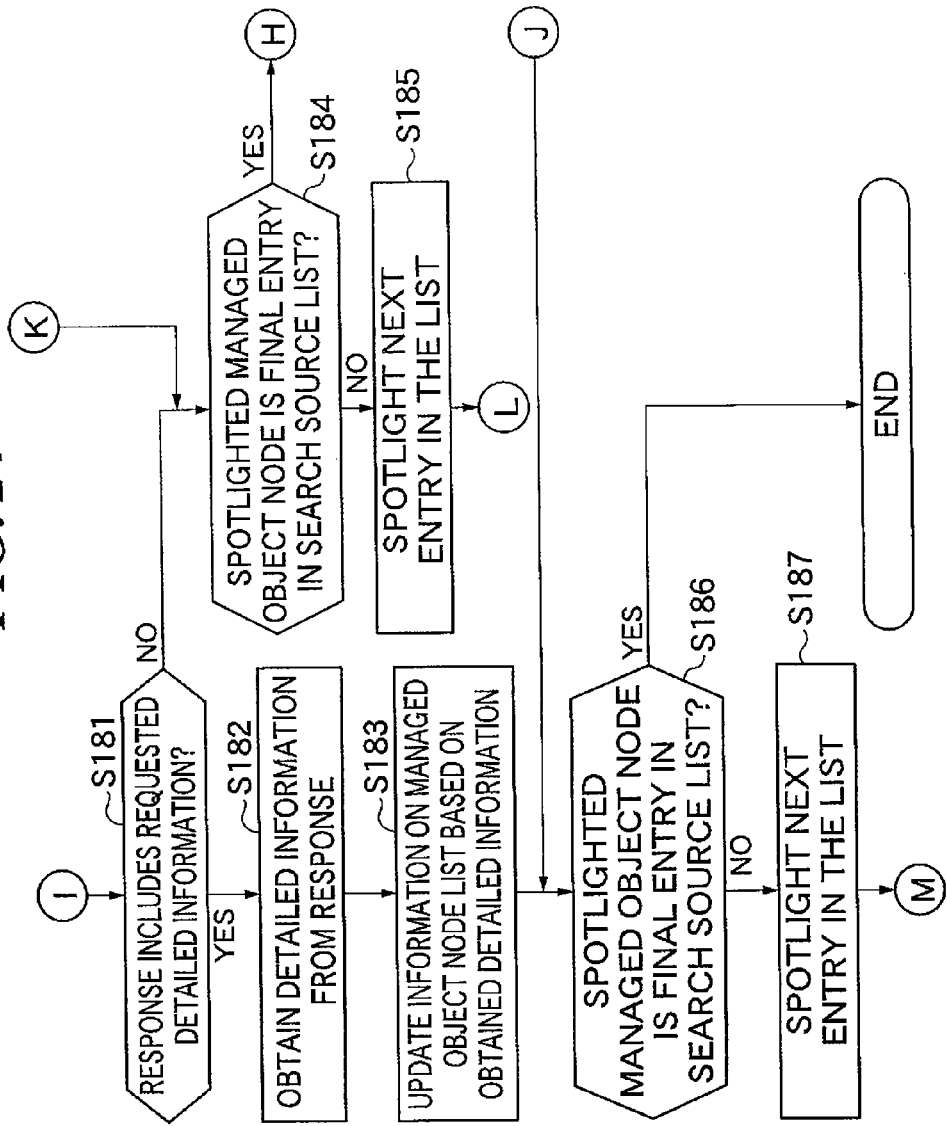
FIG. 24 is a flowchart, continued from FIG. 23, showing the procedures for carrying out a process of collecting information on the managed object nodes in the network management station.
Figure 25:
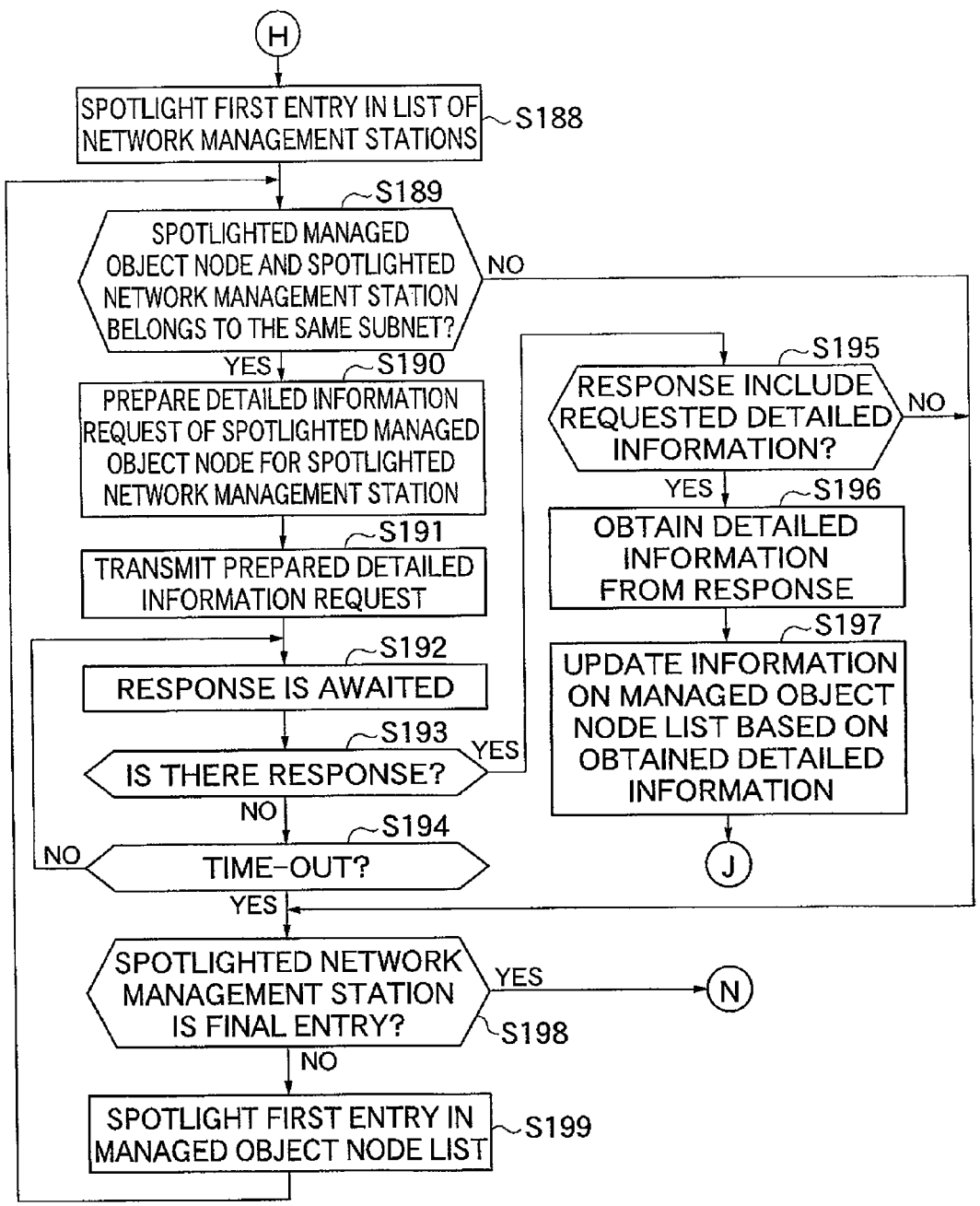
FIG. 25 is a flowchart, continued from FIGS. 23 and 24, showing the procedures for carrying out a process of collecting information on the managed object nodes in the network management station.
Figure 26:
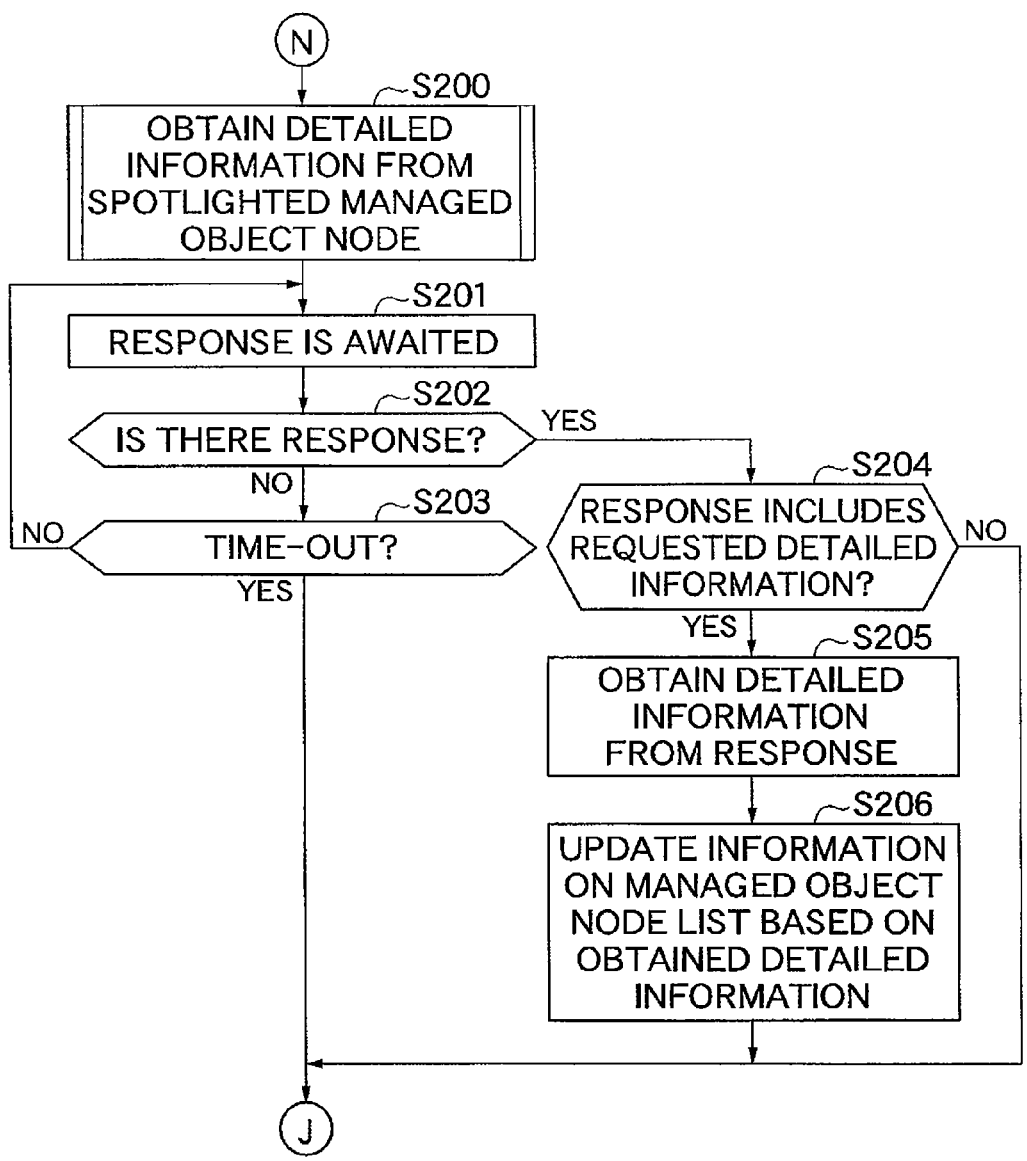
FIG. 26 is a flowchart, continued from FIGS. 23, 24 and 25, showing the procedures for carrying out a process of collecting information on the managed object nodes in the network management station.

In FIG. 23, first of all, the first entry in the management object node list is spotlighted (step S171), and then it is determined whether or not the search source list has been ever obtained from the managed object node of the entry spotlighted in the managed object node list (step S172).

When the search source list has not been obtained, the process proceeds to the step S188, whereas when the search source list has been ever obtained, the first entry in the search source list obtained in the past is spotlighted (step S173). It is determined whether or not the search source recorded in the first entry is listed in the same type of the network management station list as itself held by the network management station (step S174). When it is not listed, the process proceeds to the step S184.

When it is listed in the network management station list, it is determined whether or not the search manner recorded in the item of search manner in the entry is broadcast (step S175). When the search manner is not broadcast, the process proceeds to the step S184, whereas when the search manner is broadcast, a request is prepared to the network management station, namely the search source of the entry (step S176). This request is a detailed information request of the managed object node in the entry spotlighted in the managed object node list.

Then, the prepared detailed information request is transmitted (step S177), followed by awaiting the response (step S178), and then it is determined whether there is a response (step S179), and then when there is no response, it has become determined whether it has become time-out or not (step S180). When it has become time-out and a response from the network management station, namely the search source is not received, the process proceeds to the step S184, whereas when it has not become time-out, the process returns to the step S178.

On the other hand, when there is a response in the step S179, it is determined whether or not the requested detailed information is included in the received response (step S181). When it is included, the detailed information is obtained from the response (step S182), and then the entry spotlighted in the management object node list, namely the detailed information of the managed object node is updated with the obtained detailed information (step S183).

After the detailed information has been updated, it is determined whether or not the entry spotlighted in the management object node list is a final entry (step S186). When it is a final entry, the process is terminated, whereas when it is not a final entry, the spotlight is transferred to the next entry in the managed object node list (step S187), followed by the process returning to the step S172.

In the question of the step S181, when the detailed information is not included, it is determined whether or not the entry spotlighted in the search source node list is a final entry (step S184). When it is not a final entry, the spotlight is transferred to the next entry in the search source node list (step S185), and the process returns to the step S174.

In the question of the step 184, when it is a final entry, the first entry in the network management station list is spotlighted (step S188). It is determined whether or not the spotlighted network management station and the spotlighted management object node belong to the same subnet (step S189).

When they belong to the same subnet, a detailed information request of the managed object node is prepared for the spotlighted network management station (step S190). The prepared detailed information request is transmitted (step S191). The response is awaited (step S192), and then it is determined whether or not there is a response (step S193).

When there is a response, the process proceeds to the step S195, whereas when there is no response, it is determined whether or not it has become time-out (step S194). When it has become time-out, the process proceeds to the step S198, whereas when it has not become time-out, the process returns to the step S192.

In the question of the step S193, when there is a response, it is determined whether or not the requested detailed information is included in the obtained response (step S195). When the detailed information is not included, the process proceeds to the step S198, whereas when the detailed information is included, the detailed information included in the response is obtained (step S196), and then the information of the managed object node list is updated with the obtained detailed information (step S197), followed by the process returning to the step S186.

When they do not belong to the same subnet in the step S189, it has become time-out in the step S194, or the detailed information is not included in the step S195, the process proceeds to the step 198. Then, it is determined whether or not the spotlighted network management station is a final entry in the network management station list (step S198). When it is not a final entry, the spotlight is transferred to the next entry in the network management station list (step S199), the process returns to the step S189.

When it is a final entry, direct network connection is performed to the spotlighted management object node, and an inquiry is made to acquire the detailed information (step S200), followed by awaiting the response (step S201), and then it is determined whether or not there is a response (step S202).

When there is no response, it is determined whether or not it has become time-out (step S203). When it has become time-out, the process returns to the step S186, whereas when it has not become time-out, the process returns to the step S201.

When there is a response in the step S202, it is determined whether or not the requested detailed information is included in the response (step S204), and then when it is not included, the process returns to the step S186.

When the requested detailed information is included, the detailed information included in the response is taken out (step S205), and then the detailed information of the spotlighted management node in the managed object node list is updated (step S206), followed by the process returning to the step S186.

According to the network management system of the third embodiment, the network management station can recognize an access manner to the managed object node by recording the search manner in the search source list. For example, a method of obtaining the detailed information through the network management station capable of accessing the managed object node by broadcast, and a method of obtaining the detailed information by direct connection to the management object node are compared. When the method of obtaining the detailed information through the network management station which is located comparatively near on the network needs lower cost than that of obtaining it by direct connection to the managed object node, the former method can be surely chosen.

It should be noted that the present invention is not limited to the construction of the above-described embodiments, but any construction capable of achieving the functions described in the claims or the functions included in the construction of the embodiments is applicable.

For example, the managed object node is not limited to the MFP, but any scanners, printers, copiers, facsimiles are included.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

The above-described embodiments are merely exemplary of the present invention, and are not be construed to limit the scope of the present invention.

The scope of the present invention is defined by the scope of the appended claims, and is not limited to only the specific description in this specification. Furthermore, all modifications and changes belonging to equivalents of the claims are considered to fall within the scope of the present invention.

This application claims the benefit of Japanese Patent Application No. 2006-045503 filed Feb. 22, 2006, which is hereby incorporated by reference herein in its entirety.

What is claimed is:

1. A network management system comprising a device connected to a network, and an information processing apparatus that searches and manages said device, wherein said device comprises:
   a search source information recording means that records information related to said information processing apparatus, which is a transmitter of a search packet, as search source information in a search source list in response to receipt of the search packet; and
   a search source information transmitting means that transmits search source information content of the search source list to said information processing apparatus in response to a request from said information processing apparatus, and
   said information processing apparatus comprises:
   a search source information acquisition requesting means that requests acquisition of the search source information to said device; and
   a search source information obtaining means that obtains the search source information content of the search source list transmitted from said device;
   wherein:
   the search source information includes a network address, and
   the search source information further includes hardware identification information, and
   said device further comprises a hardware identification information determining means that determines whether or not the hardware identification information of said information processing apparatus which is the transmitter of the search packet is previously recorded in the search source list when said device itself is searched by said information processing apparatus, and
   said search source information recording means, when the hardware identification information of said information processing apparatus which is the transmitter of the search packet is determined to be already recorded in the search source list, records the network address used in said search source information and deletes previously recorded search source information of a previous search by another information processing apparatus having the same hardware identification information from the search source list, and
   said search source information recording means, when the network address of said information processing apparatus which is the transmitter of the search packet is determined to be already recorded in the search source list and when the hardware identification information of the search source information is determined not to be associated with the network address of the search source information within the search source list, records the search source information in the search source list without deleting the recorded information determined to be already recorded in the search source list.

2. A network management system as claimed in claim 1, wherein the search source information further includes a type of the search manner,
   said device further comprising a search manner determining means that determines whether or not the type of the search manner included in previously recorded search source information in the search source list is the same as the type of the search manner in the present search source information when the hardware identification of said information processing apparatus which is the transmitter of the search packet is already recorded in the search source list,
   wherein the previously recorded search source information is deleted from the search source list when the type of the search method is the same, and the previously recorded search source information is not deleted from the search source list when the type of the search method is different.

3. A network management system comprising a device connected to a network, and a plurality of information processing apparatuses that search and manage said device, wherein
   said device comprises:
   a search source information recording means that records information related to an information processing apparatus, which is a transmitter of a search packet, as search source information in a search source list in response to receipt of the search packet; and
   a search source information transmitting means that transmits search source information content of the search source list to said information processing apparatus in response to a request from said information processing apparatus, and
   said information processing apparatus comprises:
   a search source information acquisition requesting means that requests acquisition of the search source information to said device; and
   a search source information obtaining means that obtains the search source information content of the search source list transmitted from said device;
   wherein:
   the search source information includes a network address and said information processing apparatus further comprises:
   a confirmation request transmitting means that transmits to a different one of said information processing apparatuses identified from the search source information content obtained by the search source information obtaining means a request to confirm whether or not it is the same type of the information processing apparatus as its own,
   a network address recording means that records a network address of the one of said information processing apparatuses which is confirmed to be the same type of the information processing apparatus as its own by a determination result received from the one of said information processing apparatuses,
   a determination means that determines whether or not a transmitter of said request is the same type of said information processing apparatus as its own when said request is received from another of said information processing apparatuses, and
   a determination result transmitting means that transmits a result of said determination to said another of said information processing apparatuses.

4. A network management method in a network management system comprising a device connected to a network, and an information processing apparatus that searches and manages said device, the method comprising:
   said device
   recording information related to said the information-processing apparatus, which is a transmitter of a search packet, as search source information in a search source list in response to receipt of the search packet; and
   transmitting search source information content of the search source list to said information processing apparatus in response to a request from said information-processing apparatus, and said information-processing apparatus
requesting acquisition of the search source information to said device; and
obtaining the search source information content of the search source list transmitted from said device,
wherein:
the search source information includes a network address, and the search source information further includes hardware identification information, and
said device further determining whether or not the hardware identification information of said information processing apparatus which is the transmitter of the search packet is previously recorded in the search source list when said device itself is searched by said information processing apparatus, and
said device, when recording information related to said information processing apparatus, which is a transmitter of a search packet, when the hardware identification information of said information processing apparatus which is the transmitter of the search packet is determined to be already recorded in the search source list, further recording the network address used in said search source information and deleting previously recorded search source information of a previous search by another information processing apparatus having the same hardware identification information from the search source list, and
said device, when the network address of said information processing apparatus which is the transmitter of the search packet is determined to be already recorded in the search source list and when the hardware identification information of the search source information is determined not to be associated with the network address of the search source information within the search source list, recording the search source information in the search source list without deleting the recorded information determined to be already recorded in the search source list.

5. A non-transitory computer-readable storage medium storing a program for causing a computer to execute a network management method as claimed in claim 4.

6. A device that is connected to a network and searched by an information processing apparatus, comprising:
a search source information recording means that records information related to said information processing apparatus, which is a transmitter of a search packet, as search source information in a search source list in response to receipt of the search packet; and
a search source information transmitting means that transmits search source information content of the search source list to said information processing apparatus in response to a request from said information processing apparatus,
wherein:
the search source information includes a network address, and the search source information further includes hardware identification information, and
said device further comprises a hardware identification information determining means that determines whether or not the hardware identification information of said information processing apparatus which is the transmitter of the search packet is previously recorded in the search source list when said device itself is searched by said information processing apparatus, and
said search source information recording means, when the hardware identification information of said information processing apparatus which is the transmitter of the search packet is determined to be already recorded in the search source list, records the network address used in said search source information and deletes previously recorded search source information of a previous search by another information processing apparatus having the same hardware identification information from the search source list, and
said search source information recording means, when the network address of said information processing apparatus which is the transmitter of the search packet is determined to be already recorded in the search source list and when the hardware identification information of the search source information is determined not to be associated with the network address of the search source information within the search source list, records the search source information in the search source list without deleting the recorded information determined to be already recorded in the search source list.

7. A network management method in a network management system comprising a device connected to a network, and a plurality of information processing apparatuses search and manage said device, the method comprising:
said device
recording information related to an information processing apparatus, which is a transmitter of a search packet, as search source information in a search source list in response to receipt of the search packet; and
transmitting search source information content of the search source list to said information processing apparatus in response to a request from said information processing apparatus, and
said information processing apparatus
requesting acquisition of the search source information to said device; and
obtaining search source information content of the search source list transmitted from said device;
wherein:
the search source information includes a network address and
said information processing apparatus further transmitting to one of said information processing apparatuses identified from the search source information content obtained by said information processing apparatus a request to confirm whether or not it is the same type of the information processing apparatus as its own,
recording a network address of the one of said information processing apparatuses which is confirmed to be the same type of the information processing apparatus as its own by a determination result received from the one of said information processing apparatuses,
determining whether or not a transmitter of said request is the same type of said information processing apparatus as its own when said request is received from another of said information-processing apparatuses, and transmitting a result of said determination to said another of said information processing apparatuses.

8. A non-transitory computer-readable storage medium storing the program for causing a computer to execute a network management method as claimed in claim 7.

9. A device that is connected to a network and searched by an information processing apparatus, comprising:
a search source information recording means that records information related to said information processing apparatus, which is a transmitter of a search packet, as search source information in a search source list in response to receipt of the search packet; and a search source information transmitting means that transmits search source information content of the search source list to said information processing apparatus in response to a request from said information processing apparatus, and wherein:

the search source information includes a network address and said information processing apparatus further comprises:

a confirmation request transmitting means that transmits to one of a plurality of information processing apparatuses identified from the search source information content a request to confirm whether or not it is the same type of the information processing apparatus as its own, a network address recording means that records a network address of the one of said information processing apparatuses which is confirmed to be the same type of said information processing apparatus as its own by a determination result received from the one of said information processing apparatuses, a determination means that determines whether or not a transmitter of said request is the same type of said information processing apparatus as its own when said request is received from another of said information-processing apparatuses, and a determination result transmitting means that transmits a result of said determination to said another of said information processing apparatuses.

* * * * *